United States Patent
Nahum et al.

(10) Patent No.: US 7,873,488 B2
(45) Date of Patent: Jan. 18, 2011

(54) ON-SITE CALIBRATION METHOD AND OBJECT FOR CHROMATIC POINT SENSORS

(75) Inventors: Michael Nahum, Kirkland, WA (US); David William Sesko, Woodinville, WA (US); Kim W. Atherton, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 113 days.

(21) Appl. No.: 12/330,431

(22) Filed: Dec. 8, 2008

(65) Prior Publication Data

US 2010/0145650 A1    Jun. 10, 2010

(51) Int. Cl.
*G01C 25/00* (2006.01)
*G01C 3/02* (2006.01)

(52) U.S. Cl. .......... 702/97; 702/104; 702/127; 702/150; 702/158; 702/159; 702/172; 356/601; 356/602; 356/608; 356/612; 250/339.11; 250/330; 250/341.8; 250/559.22

(58) Field of Classification Search .......... 702/97, 702/104, 127, 150, 155, 158, 159, 172; 356/601, 356/602, 608, 612; 250/339.11, 330, 341.8, 250/559.22
See application file for complete search history.

(56) References Cited

U.S. PATENT DOCUMENTS

| | | | |
|---|---|---|---|
| 4,585,349 A | 4/1986 | Gross | |
| 4,820,048 A | 4/1989 | Barnard | |
| 5,379,065 A | 1/1995 | Cutts | |
| 5,578,745 A | 11/1996 | Bayer | |
| 5,644,512 A | 7/1997 | Chernoff | |
| 5,785,651 A | 7/1998 | Kuhn | |
| 6,016,684 A | 1/2000 | Scheer | |
| 6,028,008 A | 2/2000 | Bayer | |

(Continued)

FOREIGN PATENT DOCUMENTS

DE    42 11 875 A1    10/1993

(Continued)

OTHER PUBLICATIONS

Sesko, D.W., "Dynamic Compensation of Chromatic Point Sensor Intensity Profile Data Selection," U.S. Appl. No. 11/940,214, filed Nov. 14, 2007.

(Continued)

*Primary Examiner*—Sujoy K Kundu
(74) *Attorney, Agent, or Firm*—Christensen O'Connor Johnson Kindness PLLC

(57) ABSTRACT

A chromatic point sensor (CPS) calibration object and characterizing data are provided. The calibration object comprises a flat base plane with steps extending from it. Step measurement points provided by the steps and base plane measurement points provided by portions of the base plane are intermingled along a measurement track. The characterizing data characterizes known heights of the measurement points. A calibration method acquires measurement data such that some base plane measurement points should be at nearly the same measurement distance and therefore have the same common mode errors relative to known base plane measurement point heights. If such base plane measurement points exhibit minimal error variations, then measurements for those and proximate measurement points may provide reliable calibration data. In contrast, error variations outside an expected range indicate unreliable measurements that should be screened or replaced by new calibration measurements.

20 Claims, 11 Drawing Sheets

U.S. PATENT DOCUMENTS

| | | | |
|---|---|---|---|
| 6,029,115 | A | 2/2000 | Tracy |
| 6,327,041 | B1 | 12/2001 | Guern |
| 6,480,285 | B1 | 11/2002 | Hill |
| 6,869,480 | B1 | 3/2005 | Abel |
| 7,002,143 | B2 | 2/2006 | Parker |
| 2005/0030528 | A1 | 2/2005 | Geffen |
| 2006/0024061 | A1 | 2/2006 | Wirth |
| 2006/0109483 | A1 | 5/2006 | Marx |
| 2006/0197949 | A1 | 9/2006 | Bouzid |
| 2007/0148792 | A1* | 6/2007 | Marx et al. .................. 438/14 |
| 2010/0225926 | A1 | 9/2010 | Van Amstel |

FOREIGN PATENT DOCUMENTS

| | | |
|---|---|---|
| DE | 102 28 477 A1 | 1/2004 |
| DE | 10 2004 052 205 A1 | 5/2006 |
| EP | 1 647 799 A1 | 4/2006 |

OTHER PUBLICATIONS

European Search Report mailed Mar. 6, 2009, issued in European Application No. EP 08 16 7845, filed Oct. 29, 2008, 4 pages.

Geary, J.M., "Introduction to Lens Design," Willmann-Bell, Richmond, Va., 2002, p. 176.

Molesini, G., and F. Quercioli, "Pseudocolor Effects of Longitudinal Chromatic Aberration," Journal of Optics (Paris) 17(6):279-282, Nov. 1986.

"Optical Pens: Micrometric Measurement Range," STIL S.A., Aix-en-Provence, France, product brochure published on or before Mar. 6, 2007, 2 pages.

Smith, W.J., "Modern Optical Engineering," 3d ed., SPIE Press—McGraw-Hill, New York, 2000, p. 94.

Villatoro, J., et al., "Fabrication and Modeling of Uniform-Waist Single-Mode Tapered Optical Fiber Sensor," Applied Optics 42(13):2278-2283, May 2003.

* cited by examiner

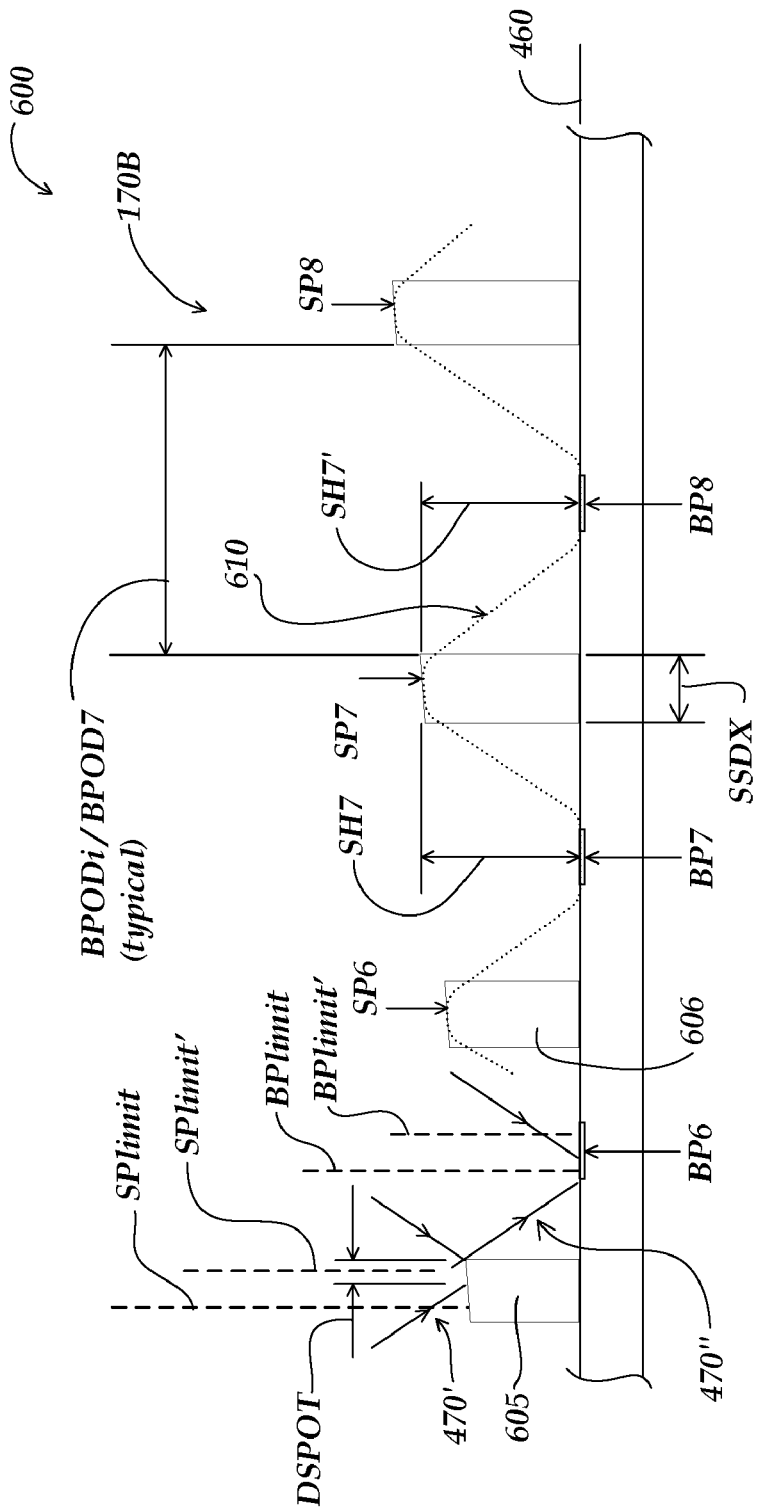
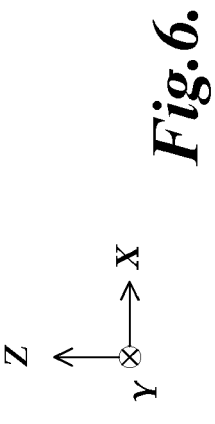
Fig. 6.
SIDE VIEW
Cross Section

US 7,873,488 B2

ON-SITE CALIBRATION METHOD AND OBJECT FOR CHROMATIC POINT SENSORS

FIELD OF THE INVENTION

The invention relates generally to precision measurement instruments, and more particularly to an improved calibration method and object for chromatic point sensors and similar and similar optical distance determining devices.

BACKGROUND OF THE INVENTION

It is known to use chromatic confocal techniques in optical height or distance sensors. As described in U.S. Publication No. 2006/0109483, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the fiber. All of the other wavelengths are poorly focused on the fiber, and so will not couple much power into the fiber. Therefore, for the light returned through the fiber, the signal level will be greatest for the wavelength corresponding to the surface height or distance to the surface. A spectrometer type detector measures the signal level for each wavelength, in order to determine the surface height.

Certain manufacturers refer to practical and compact systems that operate as described above, and that are suitable for chromatic confocal ranging in an industrial setting, as chromatic point sensors. A compact chromatically-dispersive optical assembly that is used with such systems is referred to as an "optical pen." The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" for the intensity profile, and the resulting pixel coordinate is used with a lookup table to determine the distance to the surface.

An important issue with chromatic point sensors is the stability of their components relative to their calibration. Chromatic point sensors provide very high resolution and accuracy (e.g., sub-micron resolution and accuracy) based on distance calibration data that correlates known measurement distances with the resulting dominant wavelength position coordinate along the array. At the level of resolution and accuracy provided by chromatic points sensors, component behavior inevitably drifts relative to the behavior provided at the time of calibration, resulting in measurement errors. Known methods of recalibration generally require equipment and/or a level expertise that is impractical for end-users to provide. Thus, if the measurement accuracy degrades, or if a user desires to replace a specific component of the chromatic point sensor (such as the optical pen), the entire unit may need to be sent back to the factory for recalibration. Providing improved, simplified, and/or more reliable recalibration for chromatic point sensors, and similar distance sensing devices, would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to providing a calibration method, and/or a calibration object and calibration object characterizing data that provide improved, simplified, and/or more reliable on-site or field recalibration for chromatic point sensors and similar optical distance determining devices. Using a calibration object as disclosed herein, extremely precise calibration may be provided without the requirement to move the calibration object with extreme precision. Furthermore, due to the configuration of the calibration object, transverse position information and/or the identity of measurement points (e.g., characterized measurement points as described below) may be deduced directly from relationships within the sequence of chromatic point sensor calibration measurement data, without the requirement to measure the motion or position of the calibration object when it is moved transverse to the CPS optical axis.

The calibration method and object may provide a set of calibration measurement data that is suitable for certain types of "self-verification," and the calibration object may be configured to provide a large number of densely spaced calibration measurement points throughout a CPS measuring range, using economical fabrication methods. Densely spaced calibration measurement points are a particular requirement for calibrating a chromatic point sensor (CPS), for reasons outlined further below. In various embodiments, the calibration object and calibration object characterizing data are configured such that the calibration object comprises a flat base plane and a plurality of respective steps extending from the base plane, which are configured to provide respective step measurement points along a measurement track. A plurality of respective portions of the flat base plane are exposed to provide respective base plane measurement points intermingled with the respective step measurement points along the measurement track, and the respective step measurement points are distributed at respective known heights or distances throughout a calibration object measurement range. The calibration object characterizing data comprises the respective known heights or distances of the respective step measurement points.

In various embodiments, the calibration method may comprise providing a chromatic point sensor, which generally provides a broadband illumination beam along an optical axis of the CPS as a basis for providing distance measurements, and a calibration object and calibration object characterizing data, such as those outlined above. The method may further comprise positioning the calibration object relative to the chromatic point sensor such that the measurement track of the calibration object lies along the optical axis of the chromatic point sensor, the flat base plane is oriented within 4.0 degrees of normal relative to the optical axis of the chromatic point sensor, and the calibration object measurement range of the calibration object overlaps with a measurement range of the chromatic point sensor, at least along a distance range that is to be calibrated for the chromatic points sensor. The method may then provide relative motion between the calibration object and the chromatic point sensor, the relative motion being along a motion axis that is aligned approximately parallel to the base plane, and aligned such that the chromatic point sensor illumination beam scans along the measurement track. The method further operates the chromatic point sensor to determine calibration measurement data comprising respective distance indicating coordinates corresponding to respective step measurement points and respective base plane measurement points during the illumination beam scan along measurement track, wherein the respective distance indicating coordinates correspond to respective peak wavelength coordinates on a detector element of the chromatic point sensor.

The method further comprises analyzing a current set of base plane calibration measurement data whose respective members correspond to respective base plane measurement points distributed along the measurement track, and determine whether the characteristics of the current set of base plane calibration measurement data indicate that each set member holds reliable calibration data. Because the base plane is relatively flat and well aligned, the operations outlined above should generally provide base plane calibration measurement data that includes a plurality of respective base plane measurement points at substantially the same measurement distance, such that their CPS calibration measurement data should include substantially similar common mode errors. Thus such base plane measurement points should exhibit minimal variations between their apparent errors, determined relative to a known configuration of the base plane measurement points (e.g., as provided by the calibration object characterizing data, in some embodiments). If the apparent errors of such base plane measurement points actually exhibit minimal error variations, then it is likely that their calibration measurement data is reliable, and due to the calibration object and method that are used, it is also likely that the calibration measurement data is reliable for step measurement points that are proximate to such base plane measurement points, and the CPS may be calibrated based on such data. In contrast, if the apparent errors of such base plane measurement points exhibit error variations that exceed and expected or allowed error variation for the CPS, then the calibration measurement data for such base plane measurement points is probably unreliable, and calibration measurement data should be screened to remove unreliable data, or a new calibration scan should provide new data. Thus, the method, calibration object, and the calibration object characterizing data that may provide self-verifying, reliable, calibration measurement data in a manner that is particularly suitable for on-site or filed calibration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a diagram schematically illustrating a representative section of CPS distance measurement data corresponding to a calibration scan of a second exemplary embodiment of a calibration object analogous to that shown in FIGS. 5A and 5B;

DETAILED DESCRIPTION OF THE PREFERRED EMBODIMENT

Figure 1:
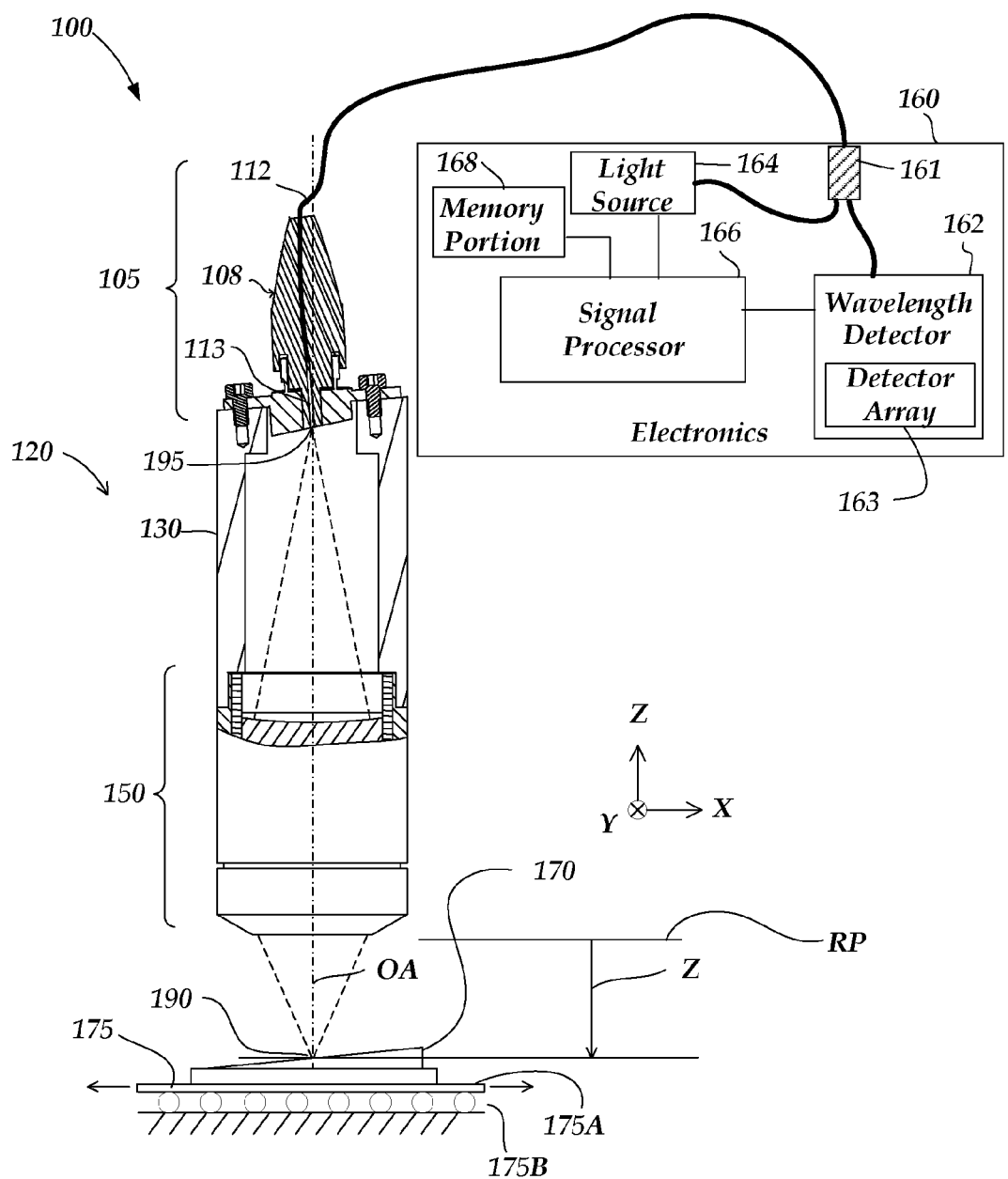
FIG. 1 is a block diagram of an exemplary chromatic point sensor (CPS) with a calibration object formed in accordance with the present invention.

FIG. 1 is a block diagram of an exemplary chromatic point sensor (CPS) 100 with a calibration object 170 formed in accordance with the present invention. As shown in FIG. 1, the CPS 100 includes an optical pen 120 and an electronics portion 160. The optical pen 120 includes an in/out fiber optic sub-assembly 105, a housing 130, and an optics portion 150. The in/out fiber optic sub-assembly 105 receives an in/out optical fiber (113 through a fiber optic cable 112 which encases it, and through a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. As will be described in more detail below, during the calibration process the light is focused on a surface location 190 of the calibration object 170. (It will be appreciated that when calibration is not being performed and regular measurements are being taken that the light is alternatively focused on a surface location of a workpiece or other object that is placed in the location where the calibration object 170 is shown in FIG. 1.) Upon reflection from the surface location 190, the light is refocused by the optics portion 150 onto the aperture 195. Due to the axial chromatic dispersion provided by the optics portion 150, only one wavelength will have the focus distance that matches the measurement distance "Z", which is the distance from a reference position RP that is fixed relative to the optical pen 120 to the surface location 190. The CPS is configured such that the wavelength that is best focused at the surface location 190 will also be the wavelength that is best focused at the aperture 195. The aperture 195 spatially filters the reflected light such that predominantly the best focused wavelength passes through the aperture 195 and into the core of the optical fiber cable 112. As will be described in more detail below, the optical fiber cable 112 routes the signal light to a wavelength detector 162 that is utilized for determining the wavelength having the dominant intensity, which corresponds to the measurement distance Z to the surface location 190.

The electronics portion 160 includes a fiber coupler 161, the wavelength detector 162, a light source 164, a signal processor 166 and a memory portion 168. In various embodiments, the wavelength detector 162 includes a detector array 163 of a spectrometer. The wavelength detector 162 may also include related signal processing (e.g., provided by the signal processor 166, in some embodiments) that removes or compensates certain detector-related error components from the profile data that is provided by the detector array 163. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2x1 optical coupler) to the fiber cable 112. As described above, the light travels through the optical pen 120 which produces longitudinal chromatic aberration so that its focal length changes with the wavelength of the light. The wavelength of light that is most efficiently transmitted back through the fiber is the wavelength that is in focus on the surface location 190. The reflected wavelength-dependent light intensity then passes through the fiber coupler 161 again so that approximately 50% of the light is directed to the wavelength detector 162, which receives the wavelength-dependent light intensity, converts it to spectral intensity profile distributed over an array of pixels along a measuring axis of the detector array 163, and operates to provide corresponding profile data based on pixel data output from the detector array 163. The subpixel-resolution distance indicating coordinate of the profile data is calculated by the signal processor 166 and determines the measurement distance Z to the surface location 190 via a distance calibration lookup table which is stored in the memory portion 168. The profile data used to determine the subpixel distance indicating coordinate is described in greater detail below.

FIGS. 1, 5A, 5B, and 6 include orthogonal XYZ coordinate axes, as a frame of reference. In each case the Z is defined to be parallel to the optical axis, or distance-measuring axis, of the optical pen 120. As illustrated in FIG. 1, during the calibration process, the calibration object 170 is placed along the optical axis OA of the optical pen 120. In one embodiment, the calibration object 170 is aligned and mounted on a translation stage 175 which may be advantageously aligned such that it translates along the X axis direction constrained by guide bearings 175b, with its surface 175A nominally parallel to the XY plane. The translation stage 175 may include a motion control system and may have start/stop limit switches, in some embodiments. In other embodiments, it may be moved by hand. The translation stage 175 is fabricated so as to have small errors in the "Z" direction as it moves the calibration object 170 along the X axis while step features on the calibration object 170 are measured by the CPS 100. In various embodiments, the translation stage 175 may be fabricated with roller bearings, or air bearings, or other known methods for ensuring precise motion along the X-axis direction. In one embodiment, the translation stage 175 may be omitted, and the calibration object 170 may be manually guided along a flat supporting surface and a rail aligned along the X-axis direction. The CPS 100 is calibrated by comparing step heights determined by using the CPS 100 with the calibration object 170 to the known step heights of the calibration object 170, for step heights that are densely spaced over the measuring range of the CPS. Exemplary features and calibration operations related to the calibration object 170 will be described in more detail below with reference to FIGS. 5A, 5B, 6 and 7.

Figure 2:
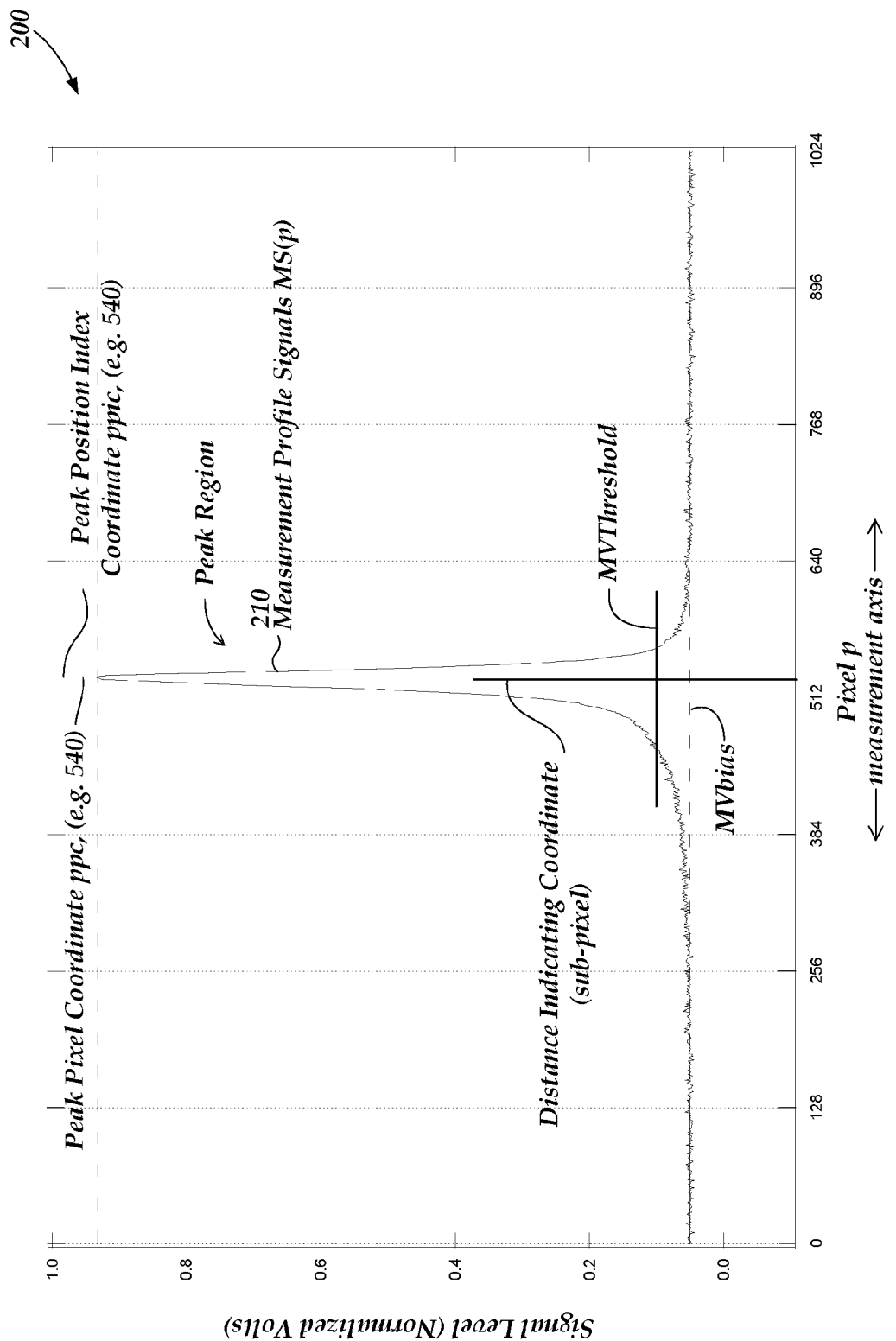
FIG. 2 is a diagram of profile data from a chromatic point sensor.
Figure 3:
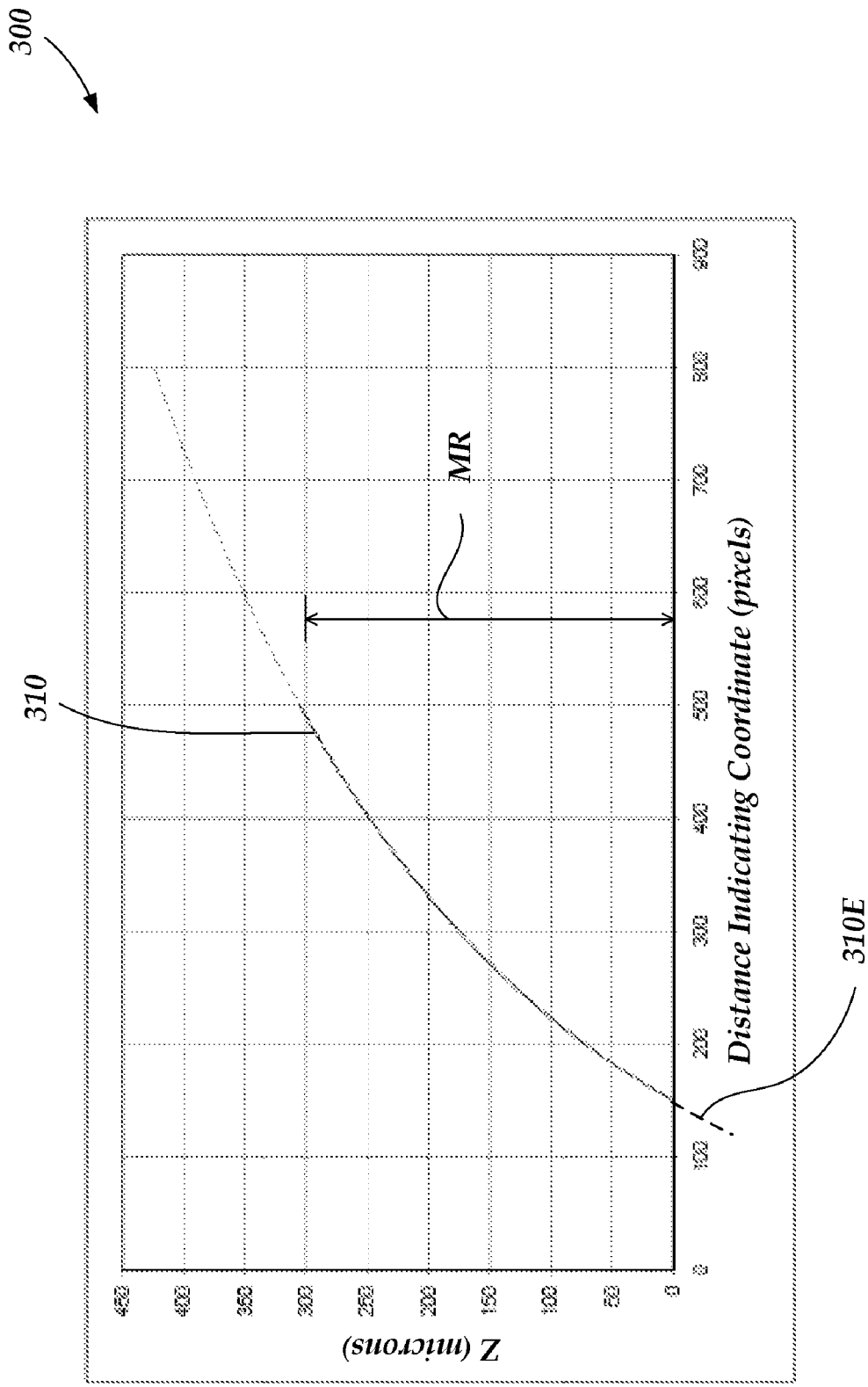
FIG. 3 is a diagram of CPS distance calibration data which correlates known measurement distances with distance indicating coordinates for a chromatic point sensor.
Figure 4:
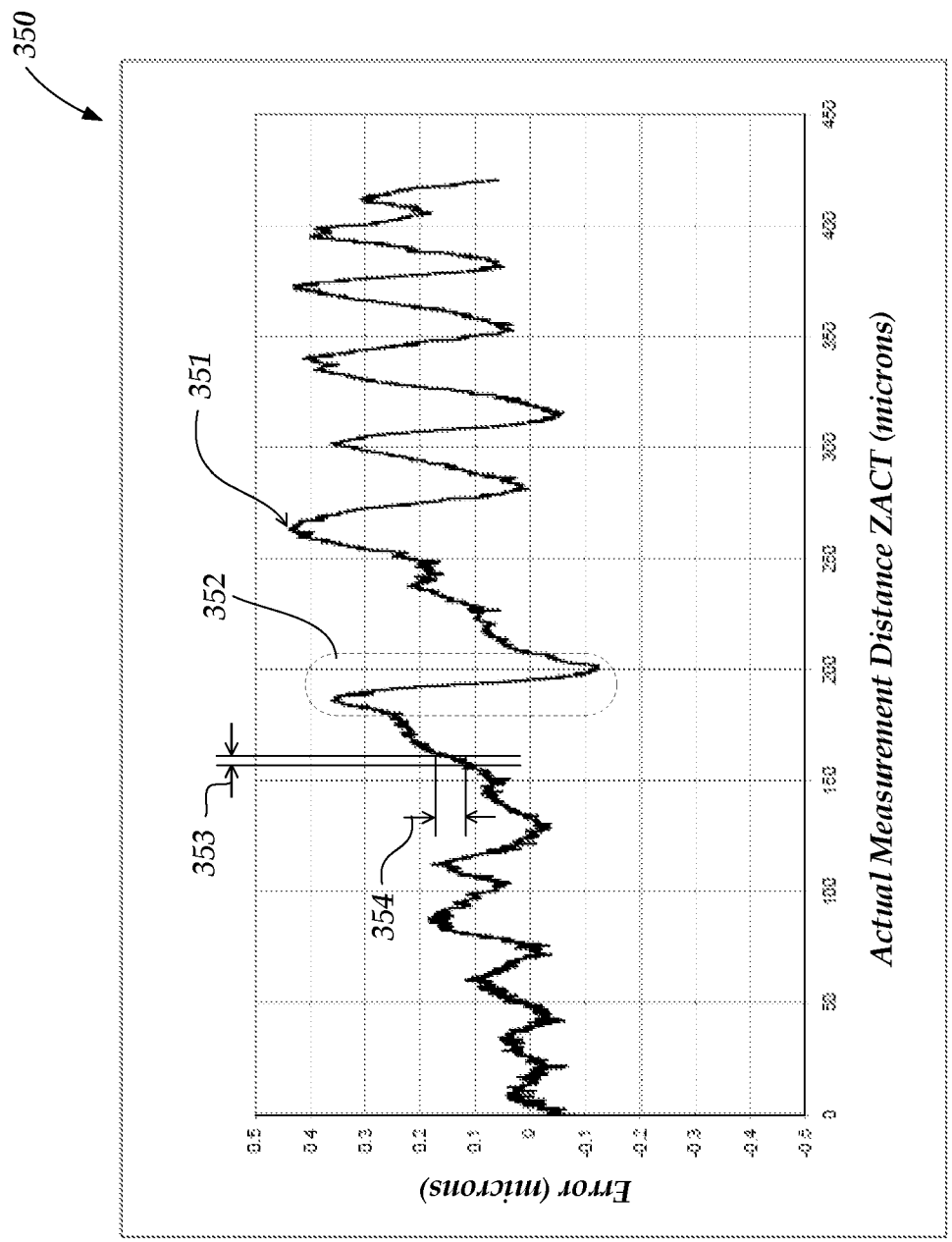
FIG. 4 is a diagram of a graph illustrating distance measurement errors versus actual z-distances for a chromatic point sensor for which drift has occurred since a previous calibration.

As previously indicated, the present invention is directed to providing a calibration method and object that provides improved, simplified, and/or more reliable recalibration for a chromatic point sensor (CPS), and similar distance sensing devices. FIGS. 2-4 provide background information that is useful for understanding the basic process of determining calibration data for a CPS, and for appreciating the accuracy and "sampling density" that is advantageous in a CPS calibration data set. This, in turn, is useful for appreciating the unique advantages of the calibration object and method disclosed herein. In particular, FIG. 2 provides background information which is useful for understanding the characteristics and use of profile data in a wavelength detector. FIG. 3 provides background information which is useful for overall understanding of CPS calibration data, and FIG. 3 provides background information that is useful for understanding the characteristics of CPS calibration errors that may be corrected by recalibration using the present invention. Various exemplary CPS operations and features outlined briefly below with reference to FIGS. 2 and 3 are described in greater detail in U.S. patent application Ser. No. 11/940,214, (the '214 application) which is hereby incorporated herein by reference in its entirety.

FIG. 2 is a diagram 200 of profile data 210 from a CPS detector, as acquired during CPS measurement operations, either during calibration or during regular operation. The profile data 210 may also be referred to as the profile signals $MS(p)$, where $MS(p)$ is the signal level (shown in normalized volts) associated with each pixel p of a detector array (e.g., the detector array 163). The graph 200 of FIG. 2 is created with a target surface positioned at some distance along the optical axis OA of the optical pen 120, producing the corresponding profile data 210 having the dominant wavelength peak region shown in FIG. 2.

FIG. 2 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 2 also shows a distance indicating coordinate (DIC) that is determined based on the distance-indicating subset of the data in the calibration spectral peak region. As described in the incorporated '214 application, MVthreshold may be an index-specific threshold, MVthreshold(ppic), in some embodiments.

Briefly, in one embodiment, measurement operations for determining a distance indicating coordinate (e.g., a distance indicating coordinate DIC, as described relative to the profile data 210), may include the following:

Position the target surface along the optical axis OA, and capture the resulting profile data 210.

Determine the peak pixel coordinate (that is, the pixel having the highest signal).

Determine the peak position index coordinate ppic, which is the index for storing and retrieving certain calibration data. This may be the same as the peak pixel coordinate in some embodiments.

Determine the measurement bias signal level MVbias.

Determine the data threshold MVthreshold (e.g., as a percentage of the peak height, or based on index-specific threshold calibration data that corresponds to the current peak position index coordinate ppic).

Determine the distance indicating coordinate DIC with sub-pixel resolution, based on the distance-indicating subset of the data that has a value greater than MVthreshold in the measurement peak region.

For a calibration measurement, independently determine the corresponding distance to the target surface with a desired accuracy (e.g., by interferometer), and determine a calibration data point in a calibration table or curve (e.g., a calibration table or curve such as that represented by the calibration data 310, shown in FIG. 3

For a workpiece measurement, determine the measurement distance by correlating the measurement DIC with a corresponding distance in the stored distance calibration data (e.g., a calibration table or curve such as that represented by the calibration data 310, shown in FIG. 3.)

The distance indicating coordinate DIC may be determined with sub-pixel resolution, based on the distance-indicating subset of data above MVthreshold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$X_c = \frac{\sum_{p=1}^{1024} p(S_M(p))^n}{\sum_{p=1}^{1024} (S_M(p))^n} \quad \text{(Eq. 1)}$$

where, $$S_M(p) = \begin{cases} MS(p) - MVthreshold(ppic), & \text{for } MS(p) \geq MVthreshold(ppic) \\ 0, & \text{for } MS(p) < MVthreshold(ppic) \end{cases} \quad \text{(Eq. 2)}$$

In one specific example, n=2, in EQUATION 1. It will be appreciated that EQUATION 2 restricts the data used in the centroid calculation to a distance-indicating subset of data. When the distance indicating coordinate DIC is determined during calibration operations, it may be referred to as a calibration distance indicating coordinate, as well as a measurement distance indicating coordinate.

FIG. 3 is a diagram 300 of CPS measurement distance calibration data 310 which correlates known measurement distances Z (in microns) along the vertical axis with distance indicating coordinates (in units of pixels), for the CPS 100, or the like. During manufacturing of the CPS, precision calibration data such as the calibration data 310 may be generated in a laboratory environment, based on known techniques. In the field, a user of the CPS may generate or correct calibration data such as the calibration data 310 using the calibration objects and methods disclosed herein. In either case, calibration data such as the calibration data 310 is subsequently used to determine a CPS distance measurement for a work piece surface, as outlined below.

An outline of one exemplary laboratory calibration method is presented here, to further clarify the nature of the CPS calibration data 310. A calibration method according to the present invention is outlined further below. In a laboratory method, a mirror may provide a calibration surface (e.g., replacing or substituting for the surface 190 of FIG. 1) along the optical axis OA of the CPS optical pen. The displacement of the mirror along the optical axis OA relative to the optical pen may be controlled by a stepper motor which steps the calibration measurement distance in approximately 0.1 or 0.2 micron steps. For each step, the actual mirror position or displacement is acquired using a reference standard, such as an interferometer. For each actual mirror position, the calibration distance indicating coordinate of the CPS is determined, based on the corresponding intensity profile data provided by the CPS detector. The calibration distance indicating coordinate and the corresponding actual position are then recorded to provide the calibration data 310.

Later, during measurement operations, to provide a distance measurement for a workpiece surface (e.g., surface 190 of FIG. 1), the workpiece surface is positioned along the optical axis OA of the CPS optical pen. The measurement distance indicating coordinate of the CPS is determined, based on the measurement DIC determined from the intensity profile data provided by the CPS detector. Then, the distance calibration data 310 is used to determine the CPS measurement distance Z that corresponds to that specific measurement DIC.

As illustrated along the vertical axis in FIG. 3, the reference or "zero" Z distance is somewhat arbitrary, and may be set at a desired reference distance relative to the optical pen 120. For the example shown in FIG. 3, the corresponding CPS 100 has a specified measurement range MR of 300 microns, which corresponds to calibration distance indicating coordinates in the range of approximately 150-490 pixels. The specified measurement range MR may be associated with or determined by the characteristics of a particular optical pen 120. The specified measurement range MR may correspond to data peaks that range over a subset of the pixels of the detector array 163. However, the CPS 100 may be calibrated over a larger pixel range of the detector array 163, if desired. For example, FIG. 3 shows optional additional distance calibration data over the range of pixels 500-800, and over a range of pixels 150 and below, corresponding the dashed line 310E (e.g., corresponding to distances less than the "zero" CPS measurement distance in FIG. 3.)

FIG. 4 is a diagram 350 illustrating representative error plot 351 that illustrates CPS distance measurement errors (in microns) versus actual measurement distances ZACT (in microns) for an actual CPS 100' similar to the CPS 100 of FIG. 1. In the example of FIG. 4, a period of time has elapsed and/or an environmental change has occurred (e.g., a temperature change) since the previous calibration of the CPS 100', such that CPS component drift has occurred relative to the calibration, resulting in errors. It should be appreciated that the resolution and/or accuracy of CPS measurements may be on the order to nanometers, or tens of nanometers, in various embodiments. Therefore, the submicron errors shown by the plot 351 are significant. To eliminate such errors, it is advantageous to recalibrate the CPS. Since such errors may be sensitive to environmental conditions, and other factors which may vary over a relatively short time, ideally it may be advantageous to check and/or recalibrate the CPS calibration frequently (e.g., daily, or each time its components or measuring set-up are disturbed, or the like).

Furthermore, as illustrated in FIG. 3, the error plot 351 shows significant error undulations over small changes in the measurement distance. As one specific example, in region 352 between the measurement positions Z of approximately 180 and 210 microns, the error is shown to vary by approximately 0.48 microns, including an abrupt increase over the measurement range 180-185 microns, and an abrupt decrease of approximately 30 nm of error change per micron of measurement distance change over the measurement range 185-200 microns. In order to address such unpredictable error behavior over relatively small measurement distance changes, it may be advantageous to provide a relatively large number of densely spaced calibration points. For example, in the case of an optical pen having a 300 micron measurement range (e.g., corresponding to the optical pen used for the error plot 351), in one specific example embodiment it may be advantageous to provide calibration data corresponding to measurement height or distance increments of approximately 5 micron, or even more advantageously 2 microns, or 1 micron, or even 0.2 microns. Stated another way, it may be advantageous to provide calibration data corresponding to at least 60 increments, or even more advantageously 150-300 increments, or even 1500 increments, over an optical pen measurement range MR.

The methods and calibration object features disclosed herein are particularly advantageous for correcting CPS errors having the undulating characteristics of the error plot 351. In particular, it may be seen that over a short range 353 of measurement distances, on the order of 5 microns for the example in FIG. 4 (0.017 times a measuring range MR, where MR≈300 microns), the corresponding short range error variation 354, referred to simply as the short range error 354 in some contexts, is relatively small (e.g., on the order of 0.07 microns, or 0.00023 times a measuring range MR, where MR≈300 microns). Over longer ranges, and especially over ranges on the order of 15 microns or more for the example in FIG. 4 (0.05 or more times a measuring range MR, where MR≈300 microns), the corresponding long range error variation is much greater (e.g., approximately 4-8 times greater for the example in FIG. 4.) The methods and calibration object features disclosed herein exploit the relatively small short range error variation of a CPS, in order to provide a simple field calibration that significantly reduces potential errors due to drift, such as those shown in FIG. 4.

Figure 5:
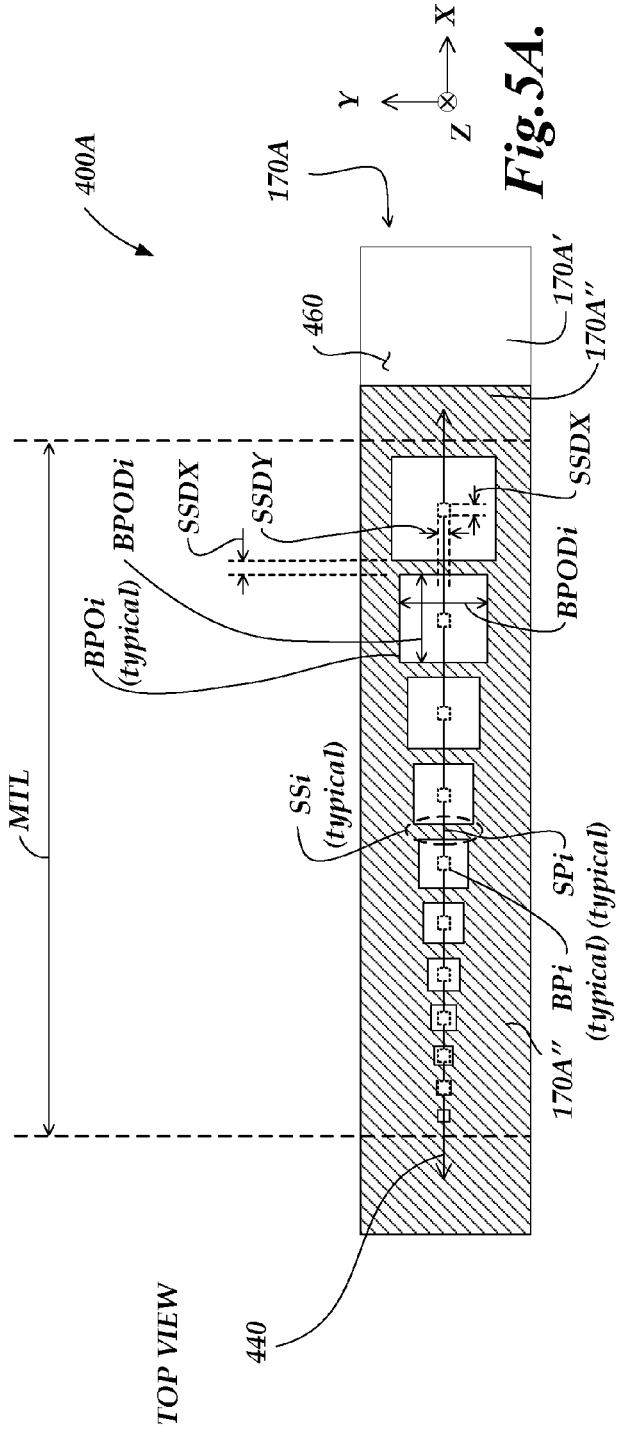
FIGS. 5A and 5B are schematic diagrams of top and side cross section views of a first exemplary embodiment of a calibration object formed in accordance with the present invention.

FIGS. 5A and 5B are schematic diagrams of top and side cross section views 400A and 400B, respectively, of a first exemplary embodiment of a calibration object 170A formed in accordance with the present invention. FIGS. 5A and 5B are schematic in the sense that, for clarity of illustration, various dimensions are not drawn to scale, and the number of step surfaces shown are far few in number than would typically be included in order to provide a desired number of measurement height or distance increments in various embodiments (e.g., 60, 150-300, or 1500 measurement distance increments over a calibration measurement range CMR). Thus, it will be understood that FIGS. 5A and 5B are provided to emphasize particular features and design principles of a calibration object according to this invention, for purposes of explanation. Advantageous implementations and embodiments may include a much larger number of step surfaces and openings, and other variations, as outlined below.

In the following discussion, the suffix "i" is to be regarded as a variable integer index that identifies the "ith" instance of an element or set of elements. As shown in FIGS. 5A and 5B, the calibration object 170A may comprise a base element 170A' that provides a nominal base plane surface or base plane 460, and a step element 170A" (indicated by cross-hatching). The step element 170A" includes surface portions or bridges which are step surfaces or steps SSi that provide step measurement points SPi, and base plane openings BPOi that expose base plane measurement points BPi.

FIG. 5A also shows a nominal measurement track 440 that may be defined across the calibration object 170A. The measurement track 440 is aligned with and/or partially defines the step measurement points SPi, and base plane measurement points BPi. Although the measurement track 440 is shown as an ideal line or path, which provides the best calibration measurement repeatability, it may be a zone having a desired width along the Y axis direction, which may provide adequate repeatability for the measurement points SPi and BPi, in some embodiments. Markings on the calibration object 170A may indicate the nominal location of the measurement track 440, to aid alignment by a user, in various embodiments. The steps SSi and the base plane 460 are reflective at least at the measurement points SPi and BPi, which are portions of the steps SSi and base plane 460, respectively, that coincide with the measurement track 440. In some embodiments, the steps SSi and/or the base plane 460 are less reflective outside of a limited dimension SSDY spanning the measurement points SPi and BPi transverse to the measurement track 440, such that the calibration object 170A will provide an intensity profile peak above a monitored threshold level, only when adequately aligned relative to the CPS optical axis. Similarly, in some embodiments, the steps SSi and/or the base plane 460 are less reflective outside of a limited dimension SSDX spanning the measurement points SPi and BPi along the measurement track 440, such that the calibration object 170A will provide an intensity profile peak above a monitored threshold level only when proximate to restricted, repeatable, locations for the measurement points SPi and BPi along the measurement track 440. In various embodiments, it may be advantageous if the dimension SSDX and/or SSDY is just slight larger than a nominal surface spot diameter DSPOT of an optical pen of the CPS that is to be calibrated, (e.g., 2*DSPOT, or 20 microns for DSPOT=10 microns) which may aid in defining a particularly repeatable locations and/or Z heights in various embodiments. Related considerations are outlined below with reference to FIG. 6.

Regarding the openings BPOi, in the embodiment shown in FIGS. 5A and 5B, each of the openings BPOi has a respective base plane opening dimension BPODi, along both the X-axis and the Y-axis, that is a related to the step height SHi of an adjacent step surface. In various embodiments, it may be advantageous if an opening dimension BPODi is chosen such when the CPS optical axis is aligned over a measuring point BPi, the opening is at least wide enough to prevent occlusion of the incoming CPS light rays (e.g., as represented by the light rays 470 in FIG. 5B) according to the numerical aperture NA of the optical pen (e.g., the optical pen 120) and the step height SHi of the adjacent step height (e.g., the step height 471 in FIG. 5B). For example, for any adjacent step height SHi, the corresponding adjacent BPODi is advantageously:

$$BPODi \geq [(k*DSPOT)+(2*SHi*\tan(\arcsin(NA)))] \quad (Eq.\ 1)$$

where k is at least 1.0, for example k may be approximately 1.5, 2, or more in various embodiments.

The opening dimensions BPODi may be assumed to apply across an entrance plane of the openings (e.g., along the surface plane 450). It will be noted that the sides of the openings BPOi may taper inward to some extent (not shown) from the opening dimensions BPODi without occluding the CPS light rays, as allowed by the convergence (focusing) of the light rays.

In some embodiments, a maximum sized opening dimension maxBPODi may have an adjacent step height maxSHi that is approximately the same as the calibration measurement range CMR. In one example:

$$\text{max}BPODi \approx [2*DSPOT+(2*MR*\tan(\arcsin(NA)))] \quad \text{(Eq. 2)}$$

According to EQUATION 2, in one example, for a calibration object that provides a calibration measurement range of CMR≈300 microns, used with a CPS having DSPOT≈10 microns and NA≈0.42, the dimension maxBPODi may be approximately 298 microns.

A nominal angle θ (shown in FIG. 5B) may be determined in cooperation with the step and opening configuration along the measurement track, in order to provide desired calibration height or distance increments over a desired calibration measurement range CMR. The error characteristics of the CPS may determine a desirable maximum calibration height increment (e.g., expressed in proportion to the CPS measuring range MR, or in microns) that is considered when configuring a calibration object for calibrating a CPS with that measuring range. In many embodiments, the calibration measurement range CMR of a calibration object may be approximately the same as, or somewhat greater than, the specified measuring range MR of the CPS that it is intended to calibrate. Therefore, in various descriptions herein, for simplicity, it is assumed that that CMR≈MR, unless otherwise indicated by description or context. However, such embodiments are exemplary only, and not limiting.

Regarding the desired calibration step height increments, it will be appreciated that for measuring points SPi arranged along a surface plane 450, if the openings BPOi have variable dimensions BPODi, then the step height increments may be largest adjacent to the largest openings and smaller adjacent to smaller openings (which may be spaced more closely). Therefore, in some embodiments, the nominal angle θ may be determined such that the step height increments adjacent to the largest openings provide the maximum desired step height increment, and the smaller openings may easily be configured to provide smaller step height increments. According to these considerations, in some embodiments, θ may be determined such that:

$$\tan\theta = \frac{\text{(desired, or maximum allowed, step height increment)}}{\text{max}BPODi} \quad \text{(Eq. 3)}$$

For example, for a 0.2 micron height increment adjacent to an opening with the dimension maxBPODi=298 microns (corresponding to CMR=300 microns and NA=0.42), this implies a maximum allowed θ of approximately θ=0.0385 degrees.

For measuring points SPi arranged along a surface plane 450 at the angle θ, this implies a minimum measurement track length of approximately:

$$MTL=CMR/\tan\theta \quad \text{(Eq. 4)}$$

The following table indicates some estimated minimum measurement track lengths MTL, for various exemplary combinations of parameters, based on the EQUATIONS 2-4, for a CPS having DSPOT=10 microns and NA 0.42.

| CMR | Max. step height increment | MTL |
| --- | --- | --- |
| 300 microns | 0.2 microns (MR/1500) | 446 millimeters |
| 300 microns | 0.5 microns (MR/600) | 179 millimeters |
| 300 microns | 1 micron (MR/300) | 89 millimeters |
| 300 microns | 2 microns (MR/150) | 45 millimeters |
| 300 microns | 5 microns (MR/60) | 18 millimeters |

Inspection of the representative error plot 351 shown in FIG. 4 shows that the error variation for a 1-2 micron change in measurement distance (which may be more generally interpreted as a change of approximately MR/300 to MR/150 in measurement distance) is approximately at the same level as the measurement noise (e.g., 20 nm). Therefore, a maximum step height increment on the order of MR/300 to MR/150, corresponding to approximately CMR/300 to CMR/150 in various embodiments, may provide an advantageous tradeoff between measurement track length and accuracy in various embodiments. It should be noted that embodiments analogous to the calibration object 170A shown in FIGS. 5A and 5B introduce additional design considerations. In the calibration object 170, the steps have an approximately-minimum constant dimension SSDX, and are spaced as close together as the approximately-minimum window openings BPOi allow. Due to the constant angle θ, step height increments are proportional to step spacing along the X axis. Therefore, for such embodiments, it may be beneficial to obtain a shorter calibration object by selecting maximum step height increment that allows a large portion (e.g., 70% or more) of the measurement track length to provide step height increments below a desired level, while a few step height increments associated with the largest step heights and largest openings are allowed to be somewhat larger.

As the measurement track length MTL increases, fabrication costs (e.g., related to making the base plane 460 desirably flat), and/or ease of use of the calibration object, may degrade. Therefore, in some embodiments where a desired combination of parameters would otherwise lead to an impractical measurement track length, a plurality of measurement track "segments" may be arranged in parallel on a shared base plane, with each measurement track providing a different range of step heights, in order to provide a relatively compact and economical calibration object.

Once a calibration object such as the calibration object 170A is fabricated, it may be precisely characterized by a set of calibration object heights or distances ZSPiACT and BPi-ACT, or by measurements that provide similar information, precisely established in a controlled environment, at the corresponding measurement points SPi and BPi along the defined measurement track (e.g., by interferometer, or the like). In some embodiments, the nominal spacings or positions XSPi and XBPi of the measurement points SPi and BPi, respectively, along the defined measurement track may also be characterized. Thereafter, such characterizing data may accompany the calibration object, for use during CPS calibration operations, as described in greater detail below.

In various embodiments, a flatter base plane 460 may provide a calibration object 170A that provides more accurate or reliable calibration results, or allows a less complicated calibration procedure, or both. It should be appreciated that height or distance measurements of at least some of the base plane measurement points BPi, as taken during calibration operations, are used to determine the slope of the base plane during calibration, relative to any base plane slope that may have influenced the calibration object characterizing data. For the most accurate calibration results, it is important that the CPS measurements that establish the slope of the base plane have only common mode errors, or at least nearly so. By inspection of FIG. 4, it may be seen that this is only reliably accomplished when the base plane measurement points BPi that are used to establish the base plane slope fall within a range corresponding to an acceptable short range error variation, for example, as previously described with respect to the short range 353 and the corresponding short range error variation 354, shown in FIG. 4. In one embodiment, the base plane slope may be established with sufficient accuracy based on calibration measurements taken at two base plane measurement points BPi that are separated by a known distance along the measurement track (which may be at least ½ the length of the measurement track in some embodiments, and more generally as long a distance as possible along the measurement track), and that have respective CPS measurement distances during calibration (e.g., ZBPiOLD distances, described further below) that vary from one another by no more that an allowed short range error variation. When these conditions are met, such measurement points are measured by the CPS with sufficiently similar "common mode" errors, that it can be reliably assumed that their CPS measurement data reflects the true slope between them with sufficient accuracy. This slope during calibration measurements may be compared to the slope between the same two base plane measurement points BPi as indicated by their characterizing data, and the difference in these slopes may be taken as the effective base plane slope during calibration. Provided that a calibration object is configured such that the base plane slope during calibration can be established in this manner, then the other base plane measurement points may deviate from flatness if desired (e.g., up to a readily fabricated level, such as 10 microns or less, in some embodiments), provided that the characterizing data includes related Z heights or Z distances, as well as their locations along the measurement track, such that their true relationships can be determined relative to the base plane points used for the base plane slope determination. In such a case, the effective base plane slope, or its corresponding tilt angle in the XZ plane, may be used for determining calibration data reliability and/or certain calibration measurement corrections, as described in greater detail below.

The allowed short range error variation, mentioned above, generally depends on the desired calibration accuracy, which generally depends on the measuring range and/or resolution of the CPS to be calibrated. In the example previously outlined with reference to FIG. 4, the allowed short range error variation 354 is provided if the actual distance measured by a CPS having a measuring range MR of 300 microns varies by at most approximately 5 microns, or approximately (0.017*MR), for the base plane points that are used to determine the base plane slope. Expressed another way, in some embodiments, the corresponding base plane slope may be at most approximately (0.017*MR/MTL), or approximately (0.017*CMR/MTL) when the calibration object calibration measuring range CMR and the CPS measuring range MR are approximately the same. These are useful characterizations because, in many cases, the short range and long range error characteristics of a CPS scale approximately in proportion to its measuring range MR. Therefore, these guidelines may be applied to various measurement ranges MR and/or CMR, in various embodiments.

It will be appreciated that the base plane slope might be established more accurately by using calibration measurements taken at more than two base plane measurement points BPi that are separated by known distances along the measurement track, and that each have respective CPS measurement distances during calibration that all fall within the allowed short range error variation. In such a case, a best fit line may give a better estimate of the base plane slope than a two-point slope determination. Furthermore, because that will tend to have similar-common mode errors, and may therefore exhibit a low error variation relative to their characterizing data, detection of unreliable calibration measurement data points may be, as described in greater detail below, may be simpler, or more robust. Thus, in various embodiments, it may be advantageous if the base plane has a flatness such that more than two, or even all, of the base plane measurement points BPi are flat within a range of at most approximately (0.017*MR). For analogous reasons, in various embodiments, it may be even more advantageous if such a base plane is furthermore aligned relative to the motion axis used during calibration scan, such that more than two, or even all, of the base plane measurement points BPi have corresponding CPS calibration measurements that fall within a range of at most approximately (0.017*MR).

According to principles outlined above, a relatively flatter base plane may offer relatively more accurate, or more robust, or simpler, CPS calibration operations. In some embodiments, the base plane 460 is formed as a flat lapped or ground surface on a metal or glass base element 170A'. Flatness may be on the order of 2 microns, or 1 micron, or less, in some embodiments. More generally, the required flatness may depend on the desired accuracy and subsequent signal processing, as outlined in greater detail below. The material of the step element 170A" may be rigidly adhered to the base plane 460. In some embodiments, the material may be a separate planar element or sheet that is bonded to the flat base plane 460. In such a case, the steps SSi and openings BPOi may be formed before (e.g., by patterned etching or laser cutting) or after (e.g., by patterned etching) the bonded step element 170A". After bonding, the step element 170A" may be ground and/or lapped, or taper etched, to provide a desired nominal angle θ and spacing between its surface plane (e.g., the surface plane 450, shown in FIG. 5B) and the base plane 460. Alternatively, the step element 170A" may be a film deposited (e.g., sputtered) or plated onto the base plane 460. The film may be patterned and/or its surface angled as outlined above, or using other known methods.

In one embodiment a step element analogous to the step element 170A" may be formed as a planar element or wedge suspended (e.g., bonded or glued at its edges) in a fixed relationship to provide a desired spacing and angle θ relative to the base plane 460. The suspended element may be made by conventional MEMS fabrication methods (e.g., silicon nitride membranes) or by etching (e.g., chemical or laser) of a metal shim. In another embodiment, a step element operationally similar to the step element 170A" may be formed as a thin film chrome pattern on a flat glass substrate, or the like. The pattern includes reflective step portions and adjacent openings as outlined above. The chrome side is placed adjacent to the base plane 460, and fixed in place at an angle θ in a manner similar to the suspended elements outlined above. The step and base plane measurements points, SPi and BPi, are measured through the glass. Such an embodiment may require compensation of the associated refractive effects, in order to provide suitable calibration results. However, such an embodiment may be satisfactory for some measurement ranges and/or levels of accuracy.

The above embodiments are exemplary only and not limiting. For example, although in the embodiment shown in FIGS. 5A and 5B, the step measurement points SPi are nominally aligned along a surface plane 450, this is not strictly necessary, although it facilitates economical fabrication. It is more important simply that the Z-distance relationships between various step measurement points SPi are known, relative the base plane measurement points BPi and/or relative to one another. Although the fabrication of the calibration object 170A has been described based on applying a step element 170A", or the like, to a previously fabricated flat base plane 460, certain alternative fabrication methods may also be used to produce calibration objects which satisfy the basic principles outlined herein. For example, in one "inverted" embodiment, lowered "steps" (e.g., troughs or pits), that provide step depths rather than heights, are fabricated relative to a flat "top surface" base plane, for example through multiple masking and etching steps, or the like. While this is expensive for dense calibration step height increments over a relatively large calibration measurement range CMR, it is a possible fabrication method. In a more economical embodiment, "steps" of equal depth are fabricated relative to a flat top surface of a monolithic element (which may be parallel to a bottom surface of that element, in some embodiments). The bottoms of the equal depth steps form the base plane. The flat top surface is then lapped at a desired angle relative to the base plane to form the calibration object.

FIG. 6 is a diagram 500 illustrating a representative section of CPS distance measurement data 610 corresponding to a calibration scan of a second exemplary embodiment of a calibration object 170B analogous to that shown in FIGS. 5A and 5B. In particular, FIG. 6 illustrates various considerations related to detecting the measurement points SPi and BPi in a particularly repeatable manner in CPS field calibration data.

FIG. 6 shows schematically represented distance measurement data 610, acquired as a CPS illumination beam scans along the measurement track. A CPS may typically acquire the measurement data 610 at a rate of at least a few KHz, so the measurement data points may be very dense. The CPS illumination beam represented in two particular locations or instances as 470' and 470". The illumination beam instance 470' shows a nominal surface spot dimension DSPOT, and is located along the X axis at a position such that if moved any farther to the right in FIG. 6, some of the rays of the illumination beam 470' would miss the edge of the step 605. The corresponding position of the optical axis of the CPS is designated as SPlimit'. An analogous limit SPlimit is shown proximate to the opposite edge of the step 605. Between SPlimit and SPlimit', the local CPS measurement distance data will indicate a maxim height. The measurement points SP6-SP8 are determined to correspond to such maximum heights (e.g., as indicated by Z measurements) in the local CPS measurement data. Outside the limits SPlimit and SPlimit', the local CPS measurement distance data will trend toward smaller heights, as schematically indicated by the distance measurement data 610.

The illumination beam instance 470" is located along the X axis at a position such that if moved any farther to the left in FIG. 6, some of the rays of the illumination beam 470" would be occluded by the edge of the step 605. The corresponding position of the optical axis of the CPS is designated as BPlimit. An analogous limit BPlimit' is shown where the illumination beam would be occluded by the edge of the step 606, if it were moved any farther to the right in FIG. 6. Between BPlimit and BPlimit', the local CPS measurement distance data will indicate a minimum height. The measurement points BP6-BP8 are determined to correspond to such minimum heights in the local CPS measurement data. Outside the limits BPlimit and BPlimit', the local CPS measurement distance data will trend toward greater heights, as schematically indicated by the distance measurement data 610.

In some embodiments, with adequate data analysis, larger dimensions SSDX (e.g., 10*DSPOT, or 100 microns, in some embodiments) may provide sufficiently repeatable measurement points SPi. However, it should be appreciated that when the steps have a minimal (but properly operable) dimension SSDX (e.g., less than 10*DSPOT, or 2*DSPOT, or 20 microns in some embodiments) the measurement points SP6-SP8 are well localized, and more likely to be repeatable. Analogous repeatability considerations may apply to minimizing the dimensions BPODi of the base plane openings BPOi, according to principles outlined above.

In various embodiments, the Z height or Z distance ZSPi of the measurement points SPi (e.g., SP6-SP8) may be indicated by a single data point corresponding to the maximum local height, or by an average of a predetermined number of data points-neighboring the that data point, or by an average of a neighboring data points within a limited Z distance from that data point, or by some other suitable analysis. The Z height or Z distance ZBPi of the measurement points BPi (e.g., BP6-BP8) may be indicated by analogous analysis.

Provided that the CPS scans the calibration object 170B along a single direction (that is, without reversing direction), the resulting alternating step and base plane distance pattern in the data may be analyzed to segregate the local set of data points that should be associated with a single step or a single base plane opening. Furthermore, provided that a particular known step or opening can be identified as corresponding to a particular segregated set of data points (e.g., a known step positioned along the optical axis of the CPS at the start of the calibration scan), then each segregated set may be correlated to a particular measurement point SPi and BPi. It should be appreciated that based on the principles outlined above, a set of Z heights or Z distances ZSPi and ZBPi may be determined corresponding to the measurement points SPi and BPi, without the need for position measurement along the X-axis direction, if desired. Corresponding sets of step heights SHi and/or SHi' (represented by instances SH7 and SH7', in FIG. 6) may also be determined based on the sets of distances ZSPi and ZBPi, if desired.

Figure 7:
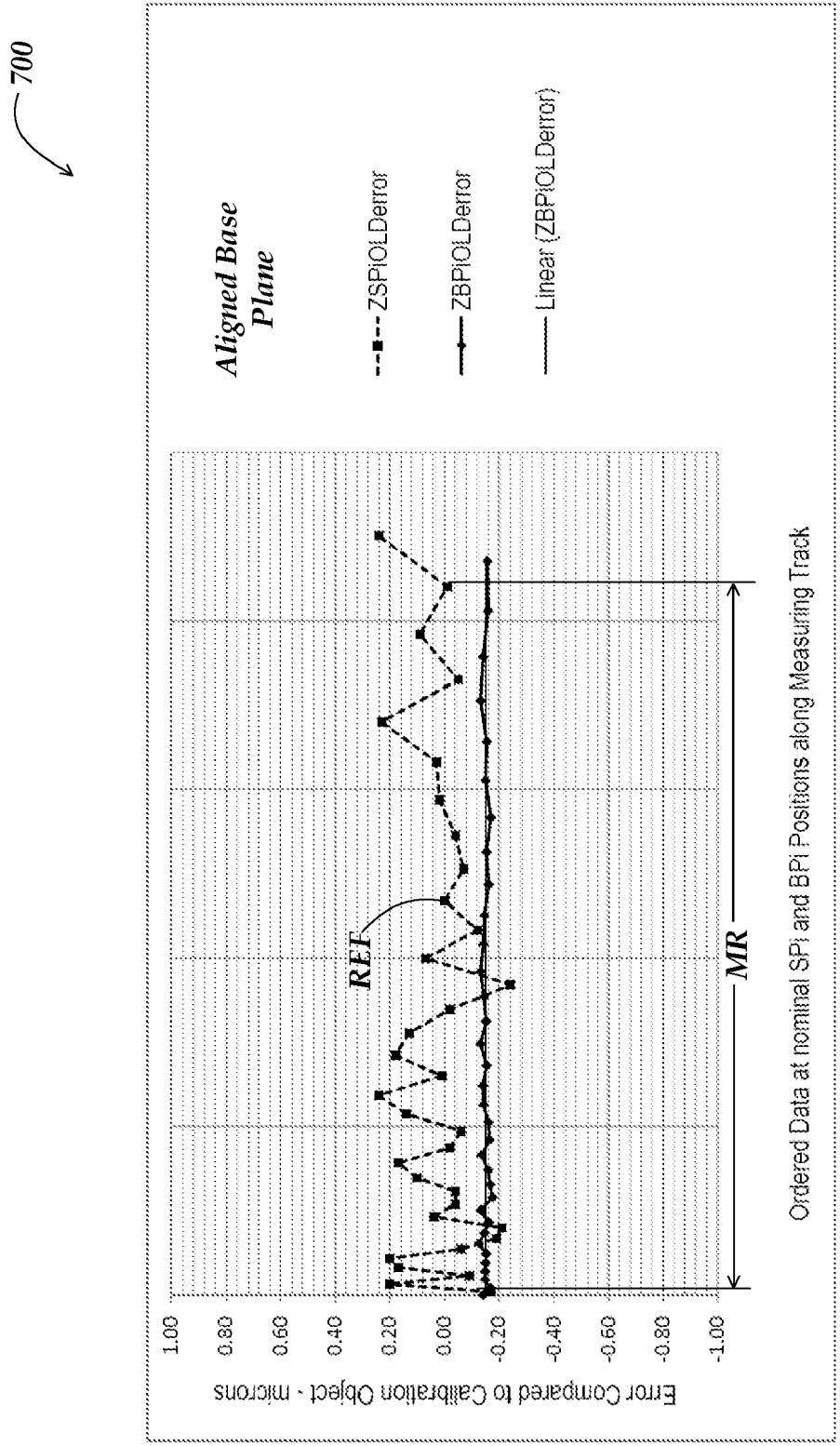
FIG. 7 is a diagram of a graph illustrating representative CPS distance measurement errors for step measurement points SPi and base plane measurement points BPi, resulting from a calibration scan for a calibration object analogous to that shown in FIGS. 5A and 5B, with the calibration object base plane well aligned with the motion axis used for the calibration scan.
Figure 8:
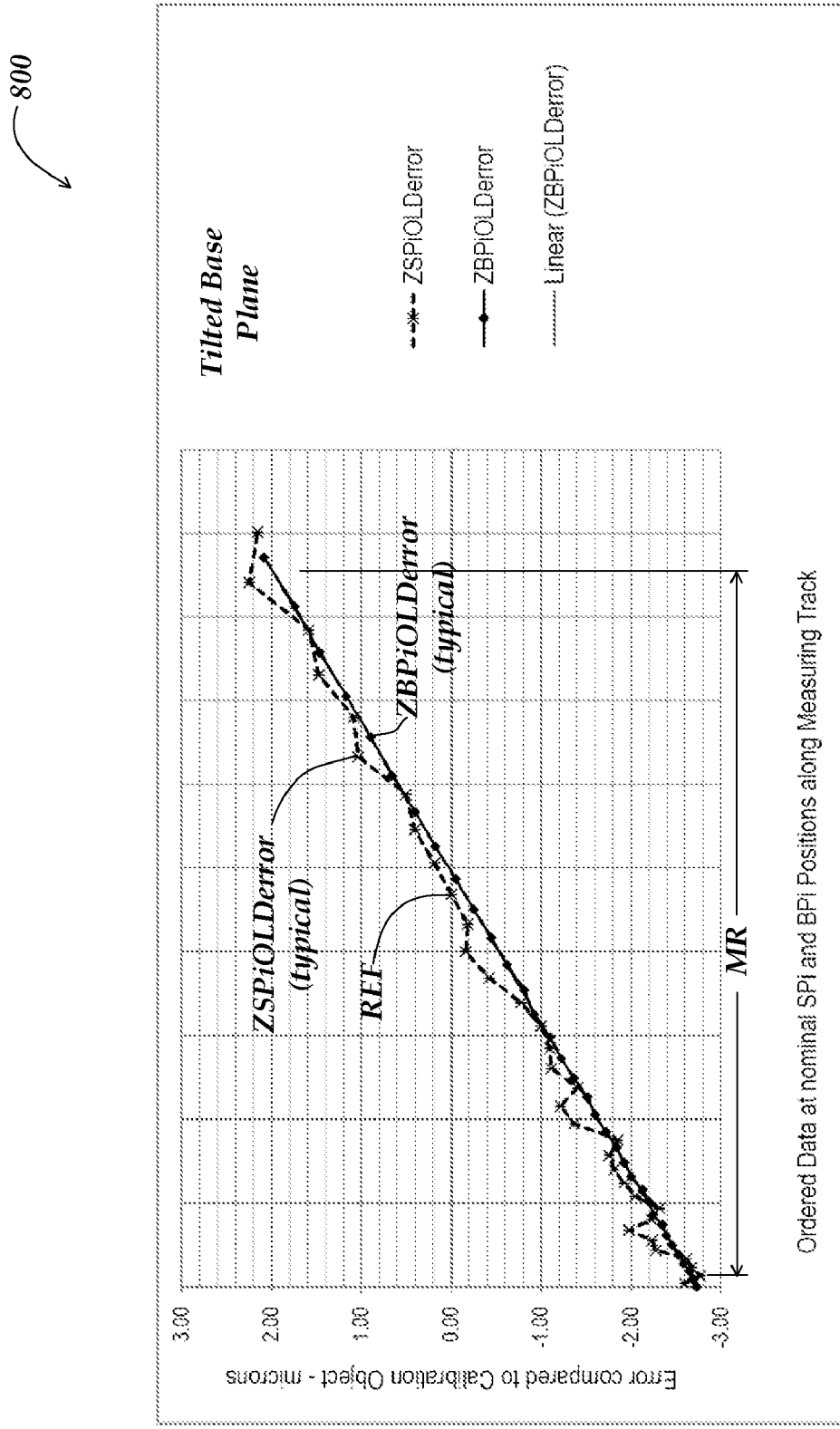
FIG. 8 is a diagram of a graph illustrating representative CPS distance measurement errors analogous to those shown in FIG. 7, except with the calibration object base plane slightly angled relative to the motion axis used for the calibration scan.

FIGS. 7 and 8 are diagrams 700 and 800, respectively, of graphs illustrating representative simulated CPS distance measurement errors identified based on a calibration scan of a calibration object analogous to that shown in FIGS. 5A and 5B. A preliminary discussion follows, to clarify certain terms and relationships related to FIGS. 7 and 8.

It should be appreciated that the previously mentioned sets of distances ZSPi and ZBPi, acquired during a field calibration scan of the calibration object 170B, are initially determined based on the existing, or "old" calibration data, of the CPS. Therefore, these sets of distances, and any quantities derived from them, may be conveniently designated with the suffix "OLD", for example ZSPiOLD, ZBPiOLD, etc. Such distances may generally include varying errors relative to the actual distances ZACT for the calibration object 170B, as previously discussed in relation to FIG. 4. The errors plotted in FIGS. 7 and 8 are such varying errors. In various embodiments, the "OLD" CPS calibration data may comprise indexed pairs that each comprise a distance indicating coordinate DIC and the corresponding known measurement distance Z established during the "OLD" calibration of the CPS, as previously discussed in relation to FIG. 3.

As previously indicated, each calibration object is characterized by an accompanying set of known calibration object heights or distances ZSPiACT and BPiACT, precisely established in a controlled environment, at the corresponding measurement points SPi and BPi along the defined measurement track (e.g., by interferometer, or the like). In some embodiments, data indicating the known spacings or positions XSPi and XBPi of the measurement points SPi and BPi, respectively, along the defined measurement track may also accompany the calibration object. ZSPiOLD and ZBPiOLD are CPS distance measurements established at the corresponding measurement points SPi and BPi based on a calibration object scan along the defined measurement track, as outlined above. It should be appreciated that corresponding to each of the measurement points SPi or BPi, the CPS determines an i-indexed distance indicating coordinate SPiDIC or BPiDIC as previously discussed in relation to FIGS. 2 and 3. These indexed distance indicating coordinates are actually the basis, in combination with the "OLD" CPS calibration data, for the resulting CPS distance measurements ZSPi and ZBPi in the embodiment described here. At least the distance indicating coordinates SPiDIC are saved for later use in establishing new CPS calibration data, in combination with corresponding true measuring distances ZSPiTMD, as described further below. The following equations define additional terms and relationships referred to further below.

$$refOFFSET=ZSPiOLD-ZSPiACT, \text{ for } i=ref \quad (Eq. 5)$$

Prior to acquiring the data ZSPiOLD and ZBPiOLD, the calibration object is aligned such that the CPS illumination spot moves along the measurement track, and the base plane is aligned nearly parallel to the motion axis that is used during the calibration object scan (e.g., as indicated by runout measurements, or the like). The distance between the CPS and the calibration object is also adjusted, such that the measuring range of the CPS approximately coincides the calibration measurement range CMR of the calibration object. There will typically be a residual offset between the known calibration object distances ZSPiACT and ZBPiACT and the corresponding acquired CPS data ZSPiOLD and ZBPiOLD. This residual refOFFSET is established at a particular measuring point "i", designated the offset reference point, where i equals a designated integer "ref". In some embodiments, it is convenient if "ref" corresponds to approximately the middle of the calibration measurement range CMR, although this optional. We define:

$$ZSPiOLDerror=ZPiOLD-(ZSPLiACT+refOFFSET) \quad (Eq. 6)$$

$$ZBPiOLDerror=ZBPiOLD-(ZBPLiACT+refOFFSET) \quad (Eq. 7)$$

The CPS distance measuring errors defined by EQUATIONS 6 AND 7 are self-explanatory, based on previous description of their constituents. In general, each measurement point SPi or BPi includes an actual additional offset ZSPiTILT and ZBPiTILT, respectively, due to the base plane slope of the calibration object in the X-Z plane relative to any base plane slope during determination of its characterizing data. The base plane slope has a corresponding to a tilt angle. Exemplary methods of determining a tilt angle are described further below with reference to FIG. 8. We define:

$$ZSPiTILT=\tan(\text{tilt angle})*(XSPi-XSPref) \quad (Eq. 8)$$

$$ZBPiTILT=\tan(\text{tilt angle})*(XBPi-XBPref) \quad (Eq. 9)$$

Then:

$$(ZSPiOLDerror-ZSPiTILT)=ZSPiOLD-(ZSPiACT+refOFFSET+ZSPiTILT) \quad (Eq. 10)$$

$$(ZBPiOLDerror-ZBPiTILT)=ZBPiOLD-(ZBPiACT+refOFFSET+ZBPiTILT) \quad (Eq. 11)$$

New CPS calibration data should pair the true measuring distance ZSPiTMD at each reliable measuring point SPi with the corresponding i-indexed distance indicating coordinate SPiDIC, which was established and saved, as previously outlined. Such indexed pairs provide new calibration data comparable to the calibration data outlined with reference to FIGS. 2 and 3, and may be used in a comparable way. For reliable measuring points:

$$-ZSPiTILT) \quad (Eq. 12)$$

Or, equivalently:

$$ZSPiTMD=ZSPiACT+refOFFSET+ZSPiTILT) \quad (Eq. 13)$$

In some embodiments, it is convenient to define:

$$ZSHiACT=ZSPiACT-ZBPiACT \quad (Eq. 14)$$

Thus, the calibration object characterizing data may include SHiACT data and ZBPiACT data, in some embodiments, and ZSPiACT data may be optional or excluded. In such cases, it will be appreciated that true measuring distances that are used in new calibration data may be determined as:

$$ZSPiTMD=ZSHiACT+ZBPiACT+refOFFSET+ZSPiTILT) \quad (Eq. 15)$$

FIG. 7 is a diagram 700 of a graph illustrating representative simulated CPS distance measurement errors ZSPiOLDerror for step points SPi, and ZBPiOLDerror for base plane points Bpi, resulting from a calibration scan for a calibration object analogous to that shown in FIGS. 5A and 5B, with the calibration object base plane relatively flat and well aligned with the motion axis used for the calibration scan. In other words, in the diagram 700, the base plane slope of the calibration object is approximately zero. The simulated CPS and calibration object have similar measuring ranges on the order of 300 microns, ZSPiOLDerror and ZBPiOLDerror are determined according to EQUATIONS 6 and 7, and compare CPS distance measurements to corresponding known distances for the calibration object. Only a sparse set of data is shown, because a full data set (e.g., for i from 1 to 60, or more) would be very dense and would detract from visualizing the following explanation. In addition, the base plane measurement error data ZBPiOLDerror has been plotted with an intentional offset of −0.18 microns relative to the step measurement error data ZSPiOLDerror, so that their data points may be more readily distinguished. In the embodiment shown in FIG. 7, the data is distributed along the horizontal axis based on known positions along the measurement track for the various corresponding measuring points SPi and BPi. However, this is done to enhance visualization of the following explanations and underlying physical arrangement, and is not necessary in all embodiments of calibration operations.

The diagram 700 shows errors ZSPiOLDerror that vary over approximately 0.4 microns throughout the measuring range MR. This is comparable to the long-range error variation seen in FIG. 4. In the absence of additional data, it is not clear whether the data ZSPiOLDerror is reliable. For example, subtle environmental variations and or calibration object or motion axis distortions, may easily contribute error variations far in excess of expected "CPS system" long range error variations due to drift, which may be on the order of +/−0.2 microns for a CPS with a 300 micron measuring range. However, a calibration object including base plane measurements points intermingled with step measurement points, allows the CPS calibration measurements to be self-verifying. In particular, when the base plane is fabricated with sufficient flatness and/or characterized, and adequately aligned with respect to the motion axis, only short range error variations should appear in the base plane measurement data. The diagram 700 shows errors ZBPiOLDerror that vary over only approximately 0.06 microns (or 0.0002 times the measuring range MR) throughout the measuring range MR. This is comparable to the expected or allowed short range error variation seen in FIG. 4, and indicates that the CPS measurements ZBPiOLD are probably reliable. The consistency of the ZBPiOLDerror data points indicates that the calibration object is well aligned (e.g., ZSPiTILT and ZBPiTILT are approximately zero) for all the data.

If each of the CPS measurements ZBPiOLD is reliable, then it is likely that each adjacent CPS measurement ZSPiOLD is also reliable, since they are acquired just microns of motion away from, and probably within a fraction of a second of, the adjacent reliable CPS measurement(s) ZBPiOLD. Conversely, if outliers are detected in the ZBPiOLDerror data, then at least those outliers, and any adjacent ZSPiOLDerror, is suspect. In some embodiments, if the outliers are relatively few and isolated, then such suspect data may be discarded and new CPS calibration data may be established based on the remaining measurement data. In other embodiments, an excessive number of outliers, or a standard deviation that is out of the expected or allowed range for the ZBPiOLDerror data, may indicate an unreliable scan that should be repeated (perhaps with certain adjustments) until reliable data is acquired. In some embodiments, the known i-positions of the data points along the measurement track are used to determine a best fit line for the ZBPiOLDerror data, and the slope of the line may be used as the base plane slope and/or as a reference for outlier detection (e.g., as described below with reference to FIG. 8). Regardless of the particular analysis that is applied to the data, the principle of configuring a calibration object such that the base plane data include only short range error variations along the entire measurement track, according to considerations outlined previously, enables "self verification" of CPS calibration data reliability. A calibration object configured to intermingle base plane measurements with step measurements during a scan, extends this benefit to individual data points. After a set of reliable calibration data is verified throughout the measuring range, for example as outlined above, it may be used as the basis for new CPS calibration data. New CPS calibration data is generally based on pairing the true measuring distance TMDSPi (e.g., as defined in EQUATIONS 12 or 13) at each reliable measuring point SPi with the corresponding i-indexed distance indicating coordinate SPiDIC, which was established and saved, as previously outlined. Such indexed pairs provide new calibration data comparable to the calibration data outlined with reference to FIGS. 2 and 3, and may be used in a comparable way.

FIG. 8 is a diagram 800 of a graph illustrating representative simulated CPS distance measurement errors analogous to those shown in FIG. 7, except with the calibration object base plane angled at a significant tilt angle or base plane slope (in the X-Z plane) relative to the motion axis used for the calibration scan. In one embodiment, such a condition may be indicated when the sets of errors ZBPiOLDerror and/or ZSPiOLDerror exceed their expected or allowed short range error variation, the errors follow a consistent positive or negative trend, and when the errors ZBPiOLDerror and ZSPiOLDerror are correlated when paired according to their index i. (A motion axis or calibration object shift during a scan may be indicated by similar data attributes, but with the errors following an inconsistent or variable trend in various segments of the data.)

For relatively small misalignments or base plane slopes, the resulting base plane calibration measurement data may still correspond to at least two base plane measurement points BPi that are separated by known distances along the measurement track and that have respective CPS measurement distances during calibration (e.g., ZBPiOLD distances), and/or ZBPiOLDerror data, that vary from one another by no more that an allowed short range error variation. Thus, in some embodiments, the known i-positions of such base plane measurement points BPi along the measurement track may be used in conjunction with their ZBPiOLDerror data to determine a base plane slope (e.g., a best fit line or a slope based data points that are spaced apart along the measurement track or X axis), and the base plane slope and the respective positions for each of the data points along the measurement track may be used to correct each of the ZBPiOLDerror and ZSPiOLDerror data points (e.g., according to EQUATIONS 8-11 or the like).

If the corrected ZBPiOLDerror data is shown to be reliable, new calibration data may be established based on that corrected data, according to equations outlined above. It should be appreciated that for excessive tilts, ZBPiOLDerror data points may include excessive "long range" error variations, such that the base plane slope cannot be reliably estimated. Therefore, in some embodiments, it is desirable that the base plane slope is at most 0.017*MR/MTL (e.g., at most 5 microns for a CPS having a specified measuring range of 300 microns), as outlined previously. In such a case, the variation in a set of data (ZBPiOLDerror−ZBPiTILT) may be analyzed, and if that variation is indicative of reliable data (e.g., the variation is less than the expected or allowed short range error variation), then the corresponding set of calibration measurement data may be used as the basis for new CPS calibration data, using ZSPiTILT corrections as outlined in EQUATIONS 8-13. In cases where the base plane slope indicated by the ZBPiOLDerror is excessive (e.g., more than 0.017*MR over the measurement track length, in some embodiments), and/or the variation in the set of data (ZBPiOLDerror−ZBPiTILT) does not indicate reliable data, then it may be advantageous if the base plane slope is physically corrected and new calibration scan data acquired.

Figure 9A:
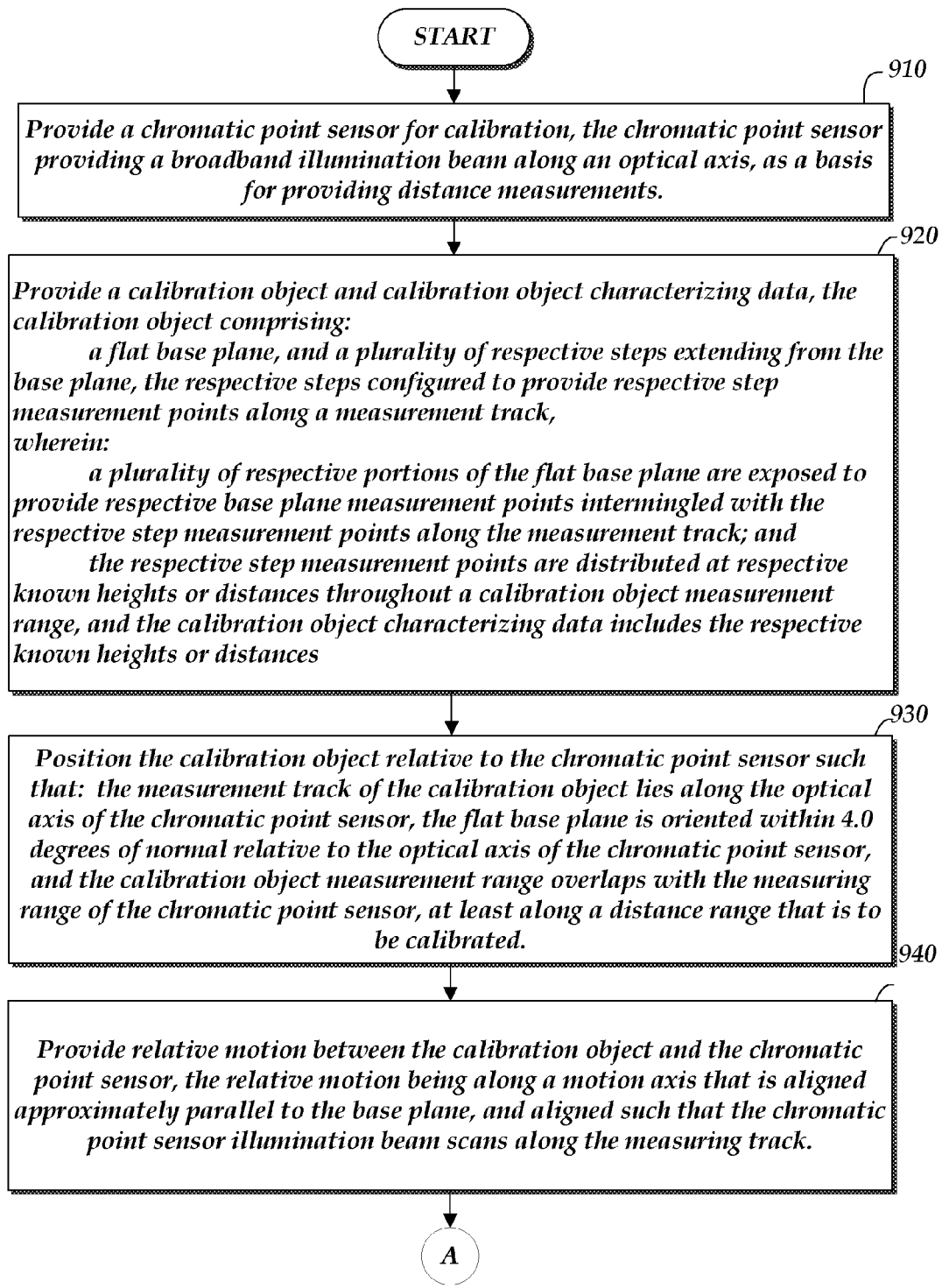
FIG. 9 is a flow diagram illustrating an exemplary routine for calibrating a chromatic point sensor utilizing a calibration object in accordance with the present invention.
Figure 9B:
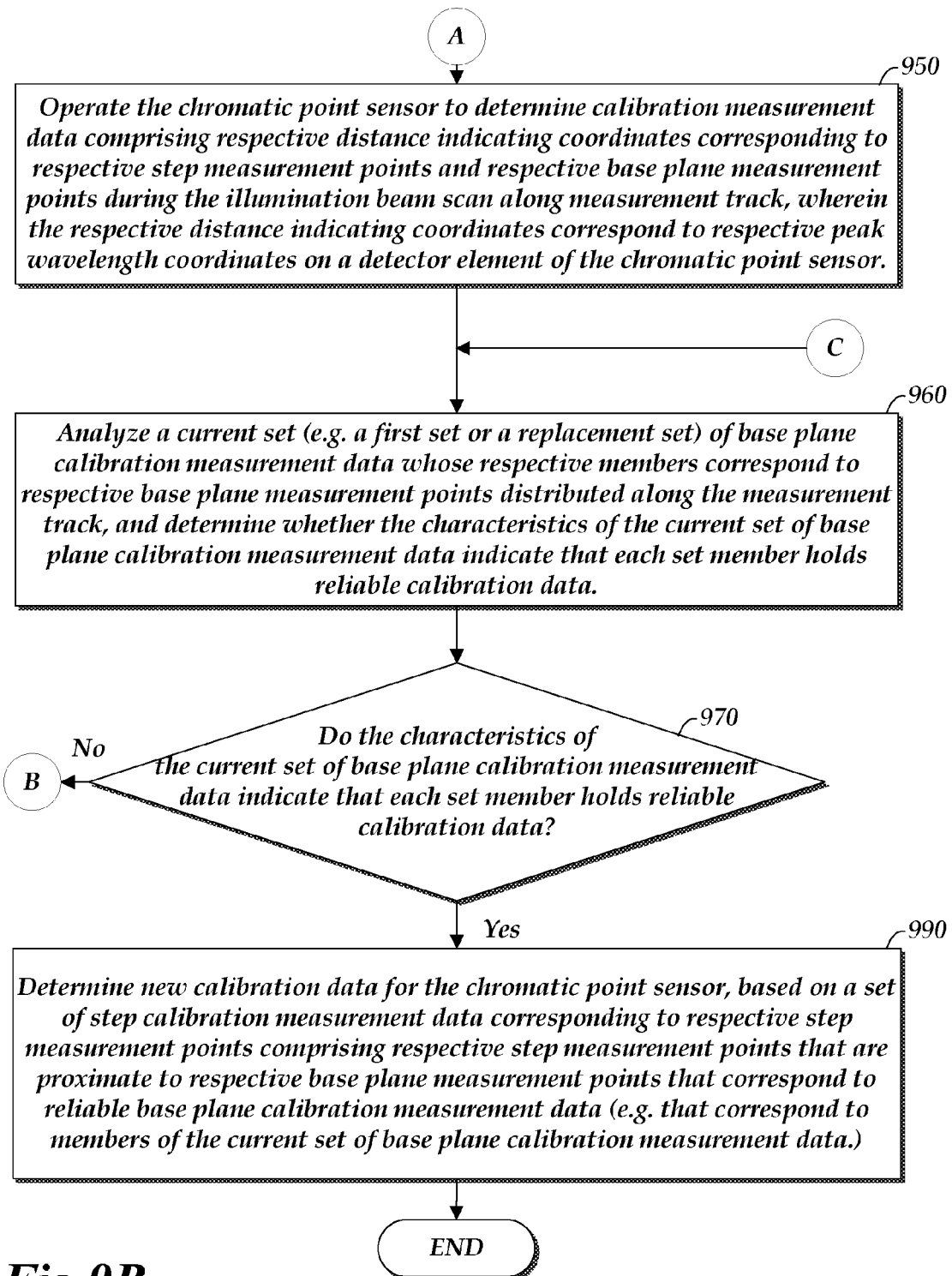
Figure 9C:
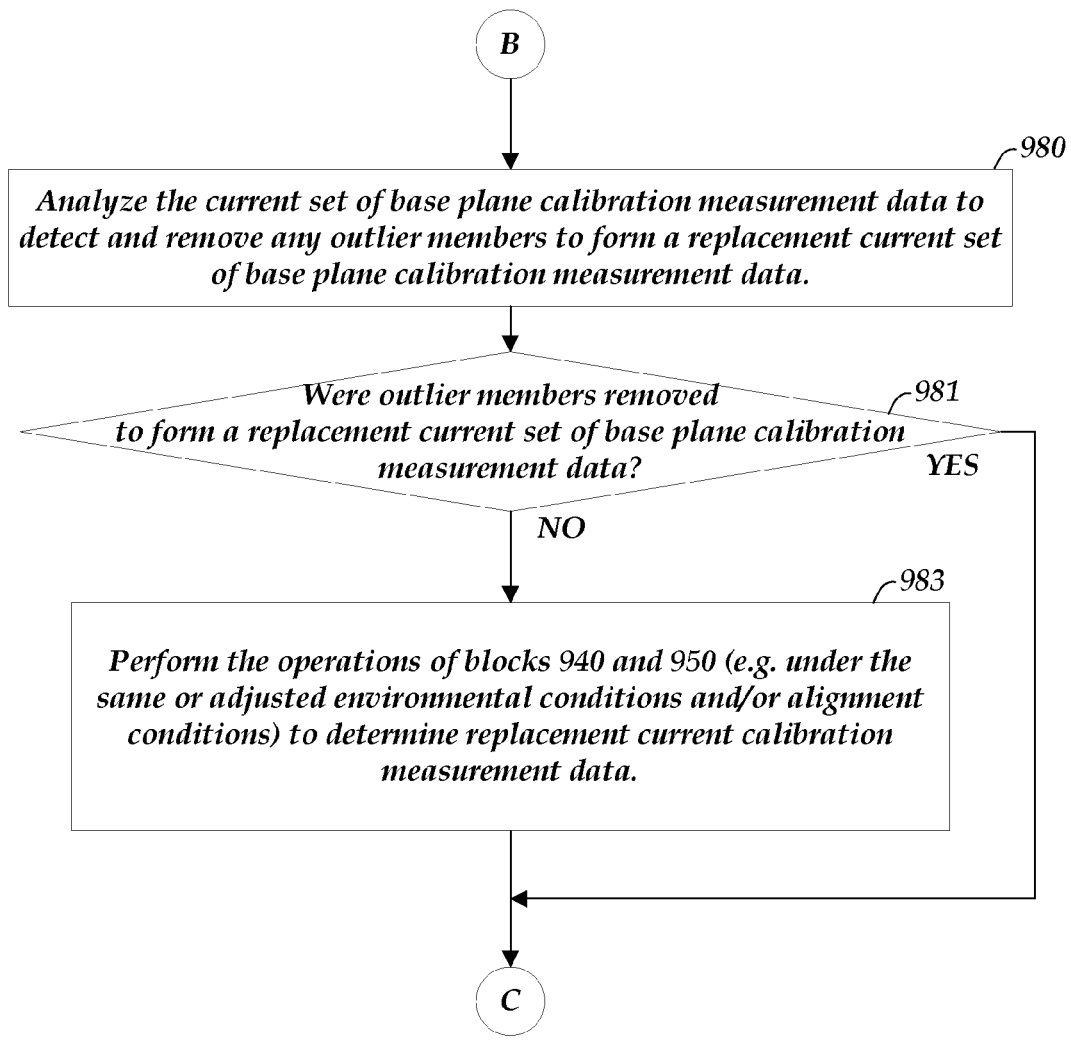

FIGS. 9A-9C are flow diagrams illustrating an exemplary routine 900 for calibrating a CPS utilizing a calibration object in accordance with the present invention. Beginning in FIG. 9A, the routine 900 starts and at a block 910 a chromatic point sensor is provided for calibration. The chromatic point sensor provides a broadband illumination beam along an optical axis, as a basis for providing distance measurements.

At a block 920, a calibration object and calibration object characterizing data are provided. The calibration object may comprise a relatively flat base plane and a plurality of respective steps extending from the base plane. The respective steps are configured to provide respective step measurement points along a measurement track and a plurality of respective portions of the flat base plane are exposed to provide respective base plane measurement points intermingled with the respective step measurement points along the measurement track. The respective step measurement points are distributed at respective known heights or distances throughout a calibration object measurement range, and the calibration object characterizing data includes the respective known heights or distances. In various embodiments, respective known heights or Z distances of the step measurement points are characterized relative to the flat base plane, or relative to one another, or both (e.g., as embodied in the previously described ZSPiACT and ZBPiACT data, or the like). In some embodiments, the calibration object characterizing data may also include measurements characterizing the heights or Z distances of the base plane measurement points relative to one another, and/or the nominal positions of the base plane measurement points and the step measurement points along the measurement track, although this latter data may optionally be omitted in some embodiments where the base plane is known to be sufficiently flat and it is known that the calibration object will be well aligned (e.g., in some embodiments, this may correspond to BPi deviations due to a combined flatness and misalignment relative to the motion axis that are on the order of 0.017 times the calibration measurement range or less).

At a block 930, the calibration object is positioned relative to the chromatic point sensor such that the measurement track of the calibration object lies along the optical axis of the chromatic point sensor, the flat base plane is oriented within 4.0 degrees of normal relative to the optical axis of the chromatic point sensor, and the calibration object measurement range overlaps with a specified measuring range of the chromatic point sensor, at least along a distance range that is to be calibrated.

At a block 940, relative motion is provided between the calibration object and the chromatic point sensor, the relative motion being along a motion axis that is aligned approximately parallel to the base plane (e.g., such that the base plane slope of the calibration object can be reliably determined, according to previously described principles) and aligned such that the chromatic point sensor illumination beam scans along the measurement track. The routine 900 then continues to a point A which is continued in FIG. 9B.

In FIG. 9B, from point A the routine continues to a block 950. At block 950, the chromatic point sensor is operated to determine calibration measurement data during the illumination beam scan along measurement track. The calibration measurement data comprises respective distance indicating coordinates corresponding to respective step measurement points and respective base plane measurement points. The respective distance indicating coordinates correspond to respective peak wavelength coordinates on a detector element of the chromatic point sensor, as outlined previously with reference to FIG. 2. It will be appreciated that the respective distance indicating coordinates may be mapped to other forms (e.g., into "old" distances, using old calibration data such as that shown in FIG. 3) for some purposes, if desired. Such forms may also be considered calibration measurement data, since they may be transformed back into, or maintained in correspondence to, the respective distance indicating coordinates.

At a block 960, a current set (e.g., a first set or a replacement set) of base plane calibration measurement data is analyzed. The respective members of the current set of base plane calibration measurement data correspond to respective base plane measurement points distributed along the measurement track. The current set of base plane calibration measurement data is analyzed to determine whether its characteristics indicate that each set member holds reliable calibration data. Various criteria for characteristics that indicate that each set member corresponds to reliable (or unreliable) calibration data have been outlined above. For example, in some embodiments, variations in a set of ZBPiOLDerror data or in a set of (ZBPiOLDerror−ZBPiTILT) data that are greater than an expected or allowed short range error variation are indicative that at least one member of the set holds unreliable data.

At a decision block 970, if the characteristics of the current set of base plane calibration measurement data indicate that each of its set members holds reliable calibration data, then the routine continues to a block 990, described further below. If the characteristics of the current set of base plane calibration measurement data indicate that any set member does not hold reliable calibration data, then the routine continues to point B, which is continued in FIG. 9C. From point B in FIG. 9C, the routine continues to a block 980. At block 980, the current set of base plane calibration measurement data is analyzed to detect and remove any outlier members, to form a replacement current set of base plane calibration measurement data. For example, in some embodiments, the set of data (ZBPiOLDerror−ZBPiTILT) may be analyzed and outliers eliminated according to Chauvenet's criterion, or other known methods, or empirically developed methods specific to a particular calibration object or CPS measuring range, or the like. At a decision block 981, if no outliers were detected during the operations of block 980 (which implies that no replacement current set of base plane calibration measurement data was formed), then the routine continues to a block 983, where operations similar or identical to the operations of blocks 940 and 950 are performed (e.g., under the same or different environmental conditions and/or alignment conditions) to determine replacement calibration measurement data that becomes the current calibration measurement data. Operation then continues from block 983 to point C, which is continued in FIG. 9B, as described further below. Otherwise, if outliers were detected during the operations of block 980, and a replacement current set of base plane calibration measurement data was formed, then operation continues from decision block 981 to point C, which is continued in FIG. 9B. In other embodiments, the outlier identification and elimination operations of block 980 and the related decision block 981 are omitted, and operation continues from point B immediately to the operations of block 983 (where new calibration scan data is acquired) each time unreliable data is indicated at decision block 970.

From point C in FIG. 9C, whether arrived at from block 981 or block 983, the routine continues to point C in FIG. 9B, and then to the previously described operations of block 960 and decision block 970. At decision block 970, if the characteristics of the (replacement) current set of base plane calibration measurement data indicate that each of its set members holds reliable calibration data, then the routine continues to block 990. At block 990, new CPS calibration data is determined based on a set of step calibration measurement data corresponding to respective step measurement points that are proximate to respective base plane measurement points that correspond to reliable base plane calibration measurement data. Then the routine 900 ends.

In some embodiments, the respective step calibration measurement data corresponds to respective step measurement points that are proximate to respective base plane measurement points that correspond to members of the current set of base plane calibration measurement data, wherein positional relationships between the respective step measurement points and the respective base plane measurement points satisfy empirically determined rules that have been found to produce sufficiently reliable and accurate CPS calibration data. In some embodiments, the set of respective step calibration measurement data used for determining the new CPS calibration data consists of set members that correspond to respective step measurement points which are located immediately adjacent (along the measurement track) to at least one base plane measurement point that corresponds to a (reliable) member of the current set of base plane calibration measurement data. More conservatively, in some embodiments, the set of respective step calibration measurement data used for determining the new CPS calibration data consists of set members that correspond to respective step measurement points which are located between two immediately adjacent base plane measurement points that correspond to (reliable) members of the current set of base plane calibration measurement data.

In various embodiments, new CPS calibration data may comprise and/or be based on calibration data pairs consisting of i-indexed distance indicating coordinates and corresponding i-indexed true measuring distances, for example determined as outlined above with reference to SPiDIC and ZSPiTMD.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for calibrating a chromatic point sensor, the method comprising:
   providing a chromatic point sensor for calibration, the chromatic point sensor providing a broadband illumination beam along an optical axis, with axial chromatic dispersion, as a basis for providing distance measurements;
   providing a calibration object and calibration object characterizing data, the calibration object comprising:
      a flat base plane; and
      a plurality of respective steps extending from the base plane and configured to provide respective step measurement points along a measurement track,
   wherein:
      a plurality of respective portions of the flat base plane are exposed to provide respective base plane measurement points intermingled with the respective step measurement points along the measurement track,
      the respective step measurement points are distributed at respective known heights or distances throughout a calibration object measurement range, and
      the calibration object characterizing data includes data characterizing the respective known heights or distances of the respective step measurement points,
   positioning the calibration object relative to the chromatic point sensor such that:
      the measurement track of the calibration object lies along the optical axis of the chromatic point sensor,
      the flat base plane is oriented within 4.0 degrees of normal relative to the optical axis of the chromatic point sensor, and
      the calibration object measurement range of the calibration object overlaps with a measurement range of the chromatic point sensor, at least along a distance range that is to be calibrated for the chromatic points sensor;
   providing relative motion between the calibration object and the chromatic point sensor, the relative motion being along a motion axis that is aligned approximately parallel to the base plane, and aligned such that the chromatic points sensor illumination beam scans along the measurement track;
   operating the chromatic point sensor to determine calibration measurement data comprising respective distance indicating coordinates corresponding to respective step measurement points and respective base plane measurement points during the illumination beam scan along measurement track, wherein the respective distance indicating coordinates correspond to respective peak wavelength coordinates on a detector element of the chromatic point sensor,
   analyzing a current set of base plane calibration measurement data whose respective members correspond to respective base plane measurement points distributed along the measurement track, and determine whether the characteristics of the current set of base plane calibration measurement data indicate that each set member holds reliable calibration data; and
   if the characteristics of the current set of base plane calibration measurement data indicate that each set member holds reliable calibration data, then determining new calibration data for the chromatic point sensor, based on a set of step calibration measurement data corresponding to respective step measurement points that are proximate to respective base plane measurement points that correspond to reliable base plane calibration measurement data.

2. The method of claim 1, wherein:
   the calibration object comprises at least N respective steps that provide respective step measurement points distributed at respective known heights or distances throughout the calibration object measurement range, where N is an integer that is at least 60; and
   the step of operating the chromatic point sensor comprises determining calibration measurement data comprising respective distance indicating coordinates corresponding to at least N respective step measurement points distributed at respective known heights or distances throughout the chromatic point sensor measurement range.

3. The method of claim 2, wherein N is at least 150.

4. The method of claim 1, wherein the plurality of respective steps extending from the base plane are configured to provide respective step measurement points that coincide with a surface plane of the calibration object.

5. The method of claim 1, wherein the set of respective step calibration measurement data used for determining the new CPS calibration data consists of set members that correspond to respective step measurement points which are located immediately adjacent along the measurement track to at least one base plane measurement point that corresponds to reliable base plane calibration measurement data.

6. The method of claim 5, wherein the set of respective step calibration measurement data used for determining the new CPS calibration data consists of set members that correspond to respective step measurement points which are located between two immediately adjacent base plane measurement points that correspond to reliable base plane calibration measurement data.

7. The method of claim 1, wherein the step of analyzing a current set of base plane calibration measurement data and determining whether the characteristics of the current set of base plane calibration measurement data indicate that each set member holds reliable calibration data comprises:
   determining an allowed short range error variation for base plane measurement point heights or distances determined by the chromatic point sensor;
   analyzing the current set of base plane calibration measurement data to determine heights or distances of the corresponding respective base plane measurement points;
   analyzing each of the determined heights or distances of the corresponding respective base plane measurement points to determine a respective error, based on known relationships between respective known heights or distances of the corresponding respective base plane measurement points; and
   if a difference between the respective errors for two of the respective base plane measurement points is greater than the allowed short range error variation, then determining that the characteristics of the current set of base plane calibration measurement data indicate that at least one of those respective base plane measurement points corresponds to a member of the current set of base plane calibration measurement data that holds unreliable data, and if no two of the respective base plane measurement points have a difference between their respective errors that is greater than the allowed short range error variation, then determining that the characteristics of the current set of base plane calibration measurement data indicate that each set member holds reliable calibration data.

8. The method of claim 7, further comprising:
eliminating any member of the current set of base plane calibration measurement data that holds unreliable data, to form a replacement current set of base plane calibration measurement data;
if the characteristics of the replacement current set of base plane calibration measurement data indicate that each set member holds reliable calibration data, then determining a reliable set of respective step measurement points that are each proximate to respective base plane measurement points that correspond to reliable base plane calibration measurement data;
if no two adjacent members of the reliable set of respective step measurement points have a difference between their known heights or distances that exceeds a maximum allowed height or distance increment, then determining new calibration data for the chromatic point sensor based on a set of step calibration measurement data corresponding to the reliable set of respective step measurement point; and
if two adjacent members of the reliable set of respective step measurement points have a difference between their known heights or distances that exceeds a maximum allowed height or distance increment, then:
repeating at least operations of the providing relative motion step and operations of the operating the chromatic point sensor step, to provide a replacement current set of base plane calibration measurement data;
repeating operations of the analyzing step using the replacement current set of base plane calibration measurement data; and
if the characteristics of the replacement current set of base plane calibration measurement data indicate that each set member holds reliable calibration data, then determining new calibration data for the chromatic point sensor, based on a set of step calibration measurement data corresponding to respective step measurement points that are proximate to respective base plane measurement points that correspond to reliable base plane calibration measurement data.

9. The method of claim 7, wherein the known relationships between the heights or distances of the corresponding respective base plane measurement points assumes that the corresponding respective base plane measurement points are coplanar based on the flat base plane deviating insignificantly from flatness with respect to the method for calibrating a chromatic point sensor.

10. The method of claim 7, wherein the calibration object characterizing data, comprises data characterizing the respective heights or distances of the respective base plane measurement points and the known relationship between the known heights or distances of the corresponding respective base plane measurement points is determined based on the calibration object characterizing data.

11. The method of claim 1, further comprising:
if the characteristics of the current set of base plane calibration measurement data indicate that any set member does not hold reliable calibration data, then repeating at least operations of the providing relative motion step and operations of the operating the chromatic point sensor step, to provide a replacement current set of base plane calibration measurement data;
repeating operations of the analyzing step using the replacement current set of base plane calibration measurement data; and
if the characteristics of the replacement current set of base plane calibration measurement data indicate that each set member holds reliable calibration data, then determining new calibration data for the chromatic point sensor, based on a set of step calibration measurement data corresponding to respective step measurement points that are proximate to respective base plane measurement points that correspond to reliable base plane calibration measurement data.

12. The method of claim 1, wherein the step of analyzing a current set of base plane calibration measurement data and determining whether the characteristics of the current set of base plane calibration measurement data indicate that each set member holds reliable calibration data comprises:
determining an allowed base plane slope;
analyzing the current set of base plane calibration measurement data to determine the indicated base plane slope; and
if the indicated base plane slope is greater than the allowed base plane slope, then determining that at least one member of the current set of base plane calibration measurement data holds unreliable data.

13. A calibration object and calibration object characterizing data for calibrating a chromatic point sensor,
the calibration object comprising:
a flat base plane; and
a plurality of respective steps extending from the base plane and configured to provide respective step measurement points along a measurement track,
wherein:
a plurality of respective portions of the flat base plane are exposed to provide respective base plane measurement points intermingled with the respective step measurement points along the measurement track, and the respective step measurement points are distributed at respective known heights or distances throughout a calibration object measurement range; and
the calibration object characterizing data comprising data characterizing the respective known heights or distances of the respective step measurement points,
wherein the calibration object and the calibration object characterizing data are utilized in calibrating a chromatic point sensor.

14. The calibration object and calibration object characterizing data of claim 13, wherein:
the calibration object comprises at least N respective steps that provide respective step measurement points distributed at respective known heights or distances throughout the calibration object measurement range, where N is an integer that is at least 60.

15. The calibration object and calibration object characterizing data of claim 14, wherein N is at least 150.

16. The calibration object and calibration object characterizing data of claim 13, wherein the plurality of respective steps extending from the base plane are configured to provide respective step measurement points that coincide with a surface plane of the calibration object, wherein the surface plane is angled with respect to the base plane.

17. The calibration object and calibration object characterizing data of claim 13, wherein the respective base plane measurement points alternate with the respective step measurement points along the measurement track.

18. The calibration object and calibration object characterizing data of claim 13, wherein the plurality of respective portions of the flat base plane that are exposed to provide respective base plane measurement points are exposed through respective base plane openings adjacent to the respective steps, and the base plane openings are smaller proximate to a first end of the measurement track where the respective step heights are smaller, and the base plane openings are larger proximate to a second end of the measurement track where the respective step heights are larger.

19. The calibration object and calibration object characterizing data of claim 13, wherein the respective steps each have a dimension that is at least 20 microns and at most 100 microns along a direction parallel to the measurement track.

20. The calibration object and calibration object characterizing data of claim 13, wherein the calibration object characterizing data comprises data characterizing respective heights or distances of the respective base plane measurement points.

* * * * *